(12) United States Patent
Shane et al.

(10) Patent No.: US 11,603,048 B2
(45) Date of Patent: Mar. 14, 2023

(54) AUTONOMOUS VEHICLE ROOF POD

(71) Applicant: Waymo LLC, Mountain View, CA (US)

(72) Inventors: Albert Shane, Berkeley, CA (US); Andreas Bauer, San Jose, CA (US); Scott Cardimen, Milford, MI (US); James Bellis, Sunnyvale, CA (US); Jonathan Sive, San Carlos, CA (US); Miklos Szentkiralyi, San Bruno, CA (US); Joshua Newby, San Francisco, CA (US)

(73) Assignee: Waymo LLC, Mountain View, CA (US)

( * ) Notice: Subject to any disclaimer, the term of this patent is extended or adjusted under 35 U.S.C. 154(b) by 316 days.

(21) Appl. No.: 16/935,249

(22) Filed: Jul. 22, 2020

(65) Prior Publication Data

US 2020/0346590 A1 Nov. 5, 2020

Related U.S. Application Data

(63) Continuation-in-part of application No. 29/722,227, filed on Jan. 28, 2020, now Pat. No. Des. 950,404, (Continued)

(51) Int. Cl.
*B60R 11/04* (2006.01)
*B60R 16/02* (2006.01)
*B60R 11/00* (2006.01)

(52) U.S. Cl.
CPC .......... *B60R 11/04* (2013.01); *B60R 16/0222* (2013.01); *B60R 2011/004* (2013.01)

(58) Field of Classification Search
CPC ................. B60R 11/04; B60R 16/0222; B60R 2011/004; B60R 9/058; B60R 16/0215
See application file for complete search history.

(56) References Cited

U.S. PATENT DOCUMENTS

| D328,436 S | 8/1992 | Fuerst et al. |
|---|---|---|
| 5,945,907 A | 8/1999 | Yaron et al. |

(Continued)

FOREIGN PATENT DOCUMENTS

| DE | 102017104988 A1 | 9/2017 |
|---|---|---|
| WO | 2017119385 A1 | 7/2017 |

OTHER PUBLICATIONS

Crowe, "How Uber Self-Driving Cars See the World," Published: Mar. 19, 2018, The Robot Report, Accessed via Internet, <URL: https://www.therobotreport.com/how-uber-self-driving-cars-see-world/> (Year: 2018).*

(Continued)

*Primary Examiner* — Sath V Perungavoor
*Assistant Examiner* — Tyler B Edwards
(74) *Attorney, Agent, or Firm* — Botos Churchill IP Law

(57) ABSTRACT

The technology includes a roof pod system for a vehicle configured to operate in one or more partly or fully autonomous self-driving modes. The roof pod system is arranged to sit above the roof of the vehicle, for instance at least 10-50 mm above the roof surface. The roof pod may be supported by a set of legs such as cross-rails. The roof pod system incorporates various sensors and related equipment to assist with self-driving operation. Some sensors may be arranged in the main housing of the roof pod, while others can be located in a dome-type structure extending above the main housing. A cabling harness assembly runs wiring and other links between the roof pod and the vehicle chassis.

20 Claims, 27 Drawing Sheets

Related U.S. Application Data and a continuation-in-part of application No. 29/689,690, filed on May 1, 2019, now Pat. No. Des. 915,913.

(60) Provisional application No. 62/879,183, filed on Jul. 26, 2019.

(56) References Cited

U.S. PATENT DOCUMENTS

| | | | |
|---|---|---|---|
| D478,518 S | 8/2003 | Porter | |
| D525,888 S | 8/2006 | Porter | |
| D563,246 S | 3/2008 | Ishii et al. | |
| 7,517,099 B2 | 4/2009 | Hannah | |
| D717,720 S | 11/2014 | Marino | |
| D734,211 S | 7/2015 | Ahn et al. | |
| D739,336 S | 9/2015 | Berrey | |
| 9,725,060 B1 | 8/2017 | Daniel et al. | |
| 9,802,656 B1 * | 10/2017 | Williams | G01S 17/89 |
| 9,862,311 B2 | 1/2018 | Kiriyama et al. | |
| D822,580 S | 7/2018 | Eriksson et al. | |
| D835,028 S | 12/2018 | Ahn et al. | |
| 10,302,744 B1 * | 5/2019 | Krishnan | B60R 11/04 |
| 10,359,507 B2 | 7/2019 | Berger et al. | |
| D866,368 S | 11/2019 | Ahn et al. | |
| D874,956 S | 2/2020 | Ahn et al. | |
| D878,264 S | 3/2020 | Ahn et al. | |
| 2012/0325360 A1 * | 12/2012 | McGrath | F16L 11/02 |
| | | | 138/109 |
| 2014/0049912 A1 * | 2/2014 | Marshall | H04B 1/3877 |
| | | | 361/679.01 |
| 2016/0011594 A1 | 1/2016 | Chung et al. | |
| 2017/0151933 A1 | 6/2017 | Doorley et al. | |
| 2017/0261273 A1 * | 9/2017 | Maranville | F25B 1/00 |
| 2017/0293016 A1 | 10/2017 | McCloskey et al. | |
| 2017/0300060 A1 | 10/2017 | Crawley | |
| 2017/0343654 A1 | 11/2017 | Valois et al. | |
| 2018/0011173 A1 | 1/2018 | Newman | |
| 2018/0015886 A1 * | 1/2018 | Frank | B60R 11/04 |
| 2018/0017680 A1 | 1/2018 | Pennecot et al. | |
| 2018/0037268 A1 | 2/2018 | Moore et al. | |
| 2018/0086280 A1 | 3/2018 | Nguyen | |
| 2018/0188361 A1 * | 7/2018 | Berger | G01S 17/931 |
| 2020/0025933 A1 | 1/2020 | Ghannam et al. | |
| 2020/0086786 A1 * | 3/2020 | Mackey | B60Q 1/05 |
| 2021/0178983 A1 * | 6/2021 | Daly, Jr. | G01S 13/865 |
| 2022/0075030 A1 * | 3/2022 | D'Antonio | G01S 13/931 |

OTHER PUBLICATIONS

PCT Search Report and Written Opinion in International Application No. PCT/US2020/043068, dated Oct. 15, 2020.

* cited by examiner

400

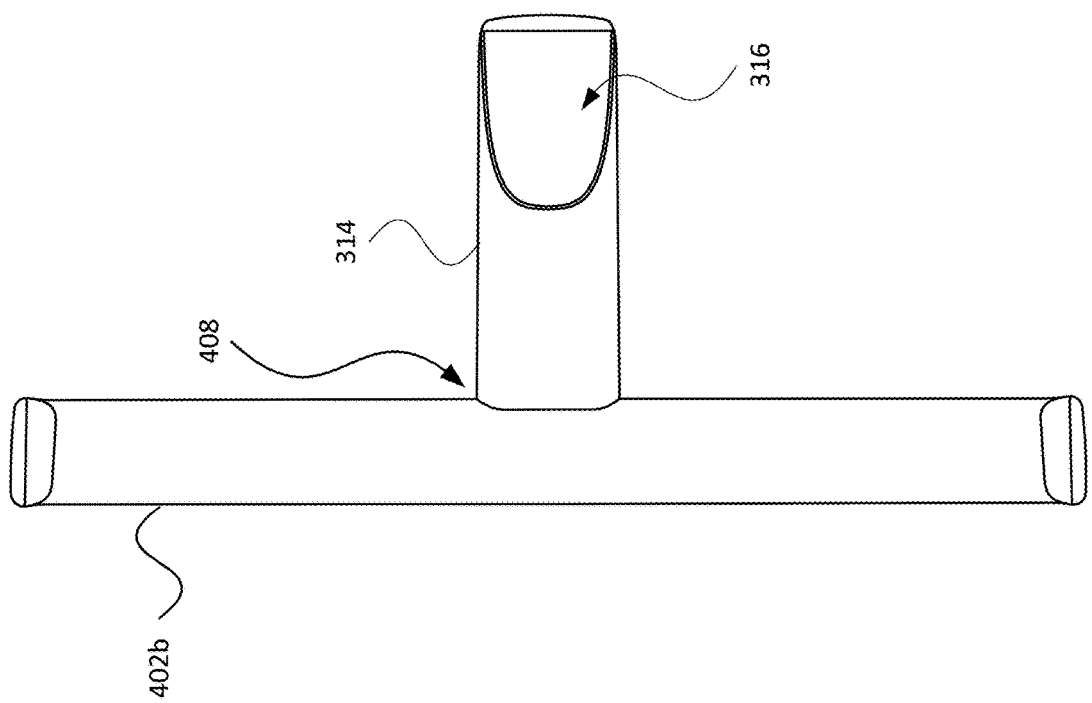
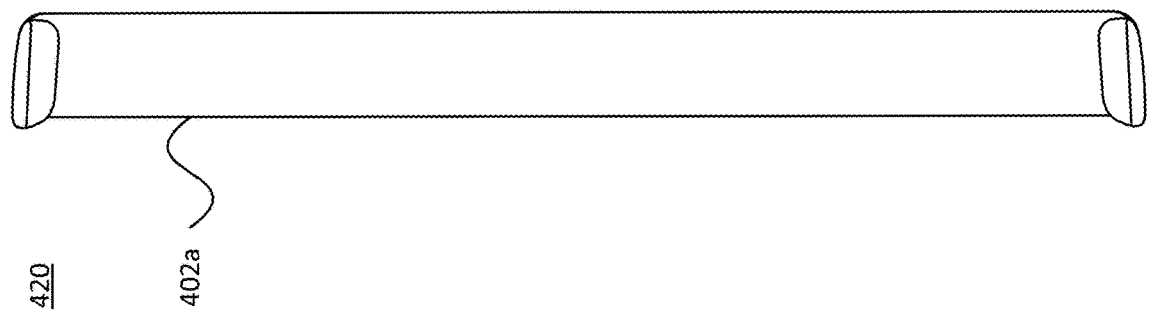
Fig. 4B

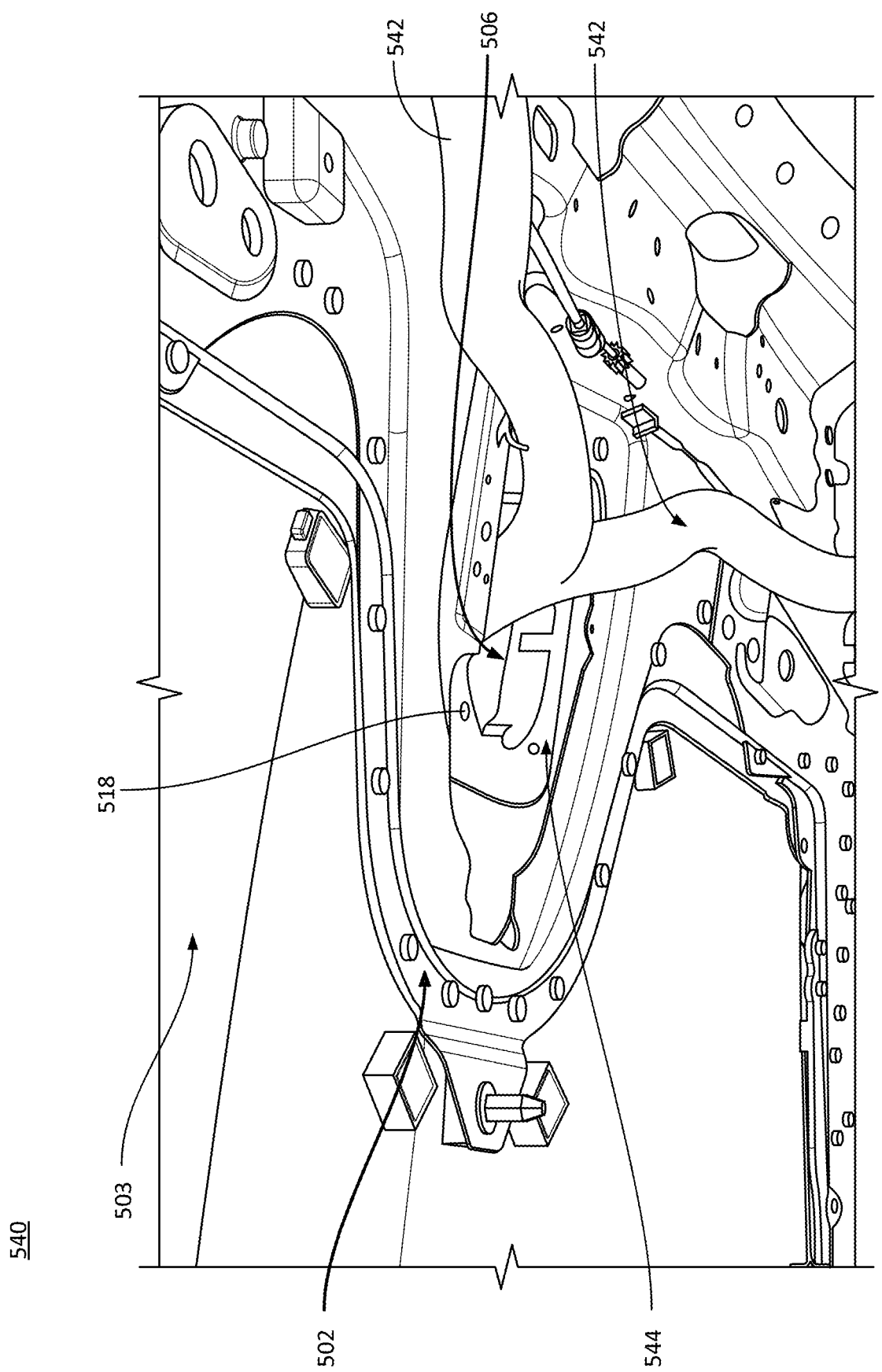

600

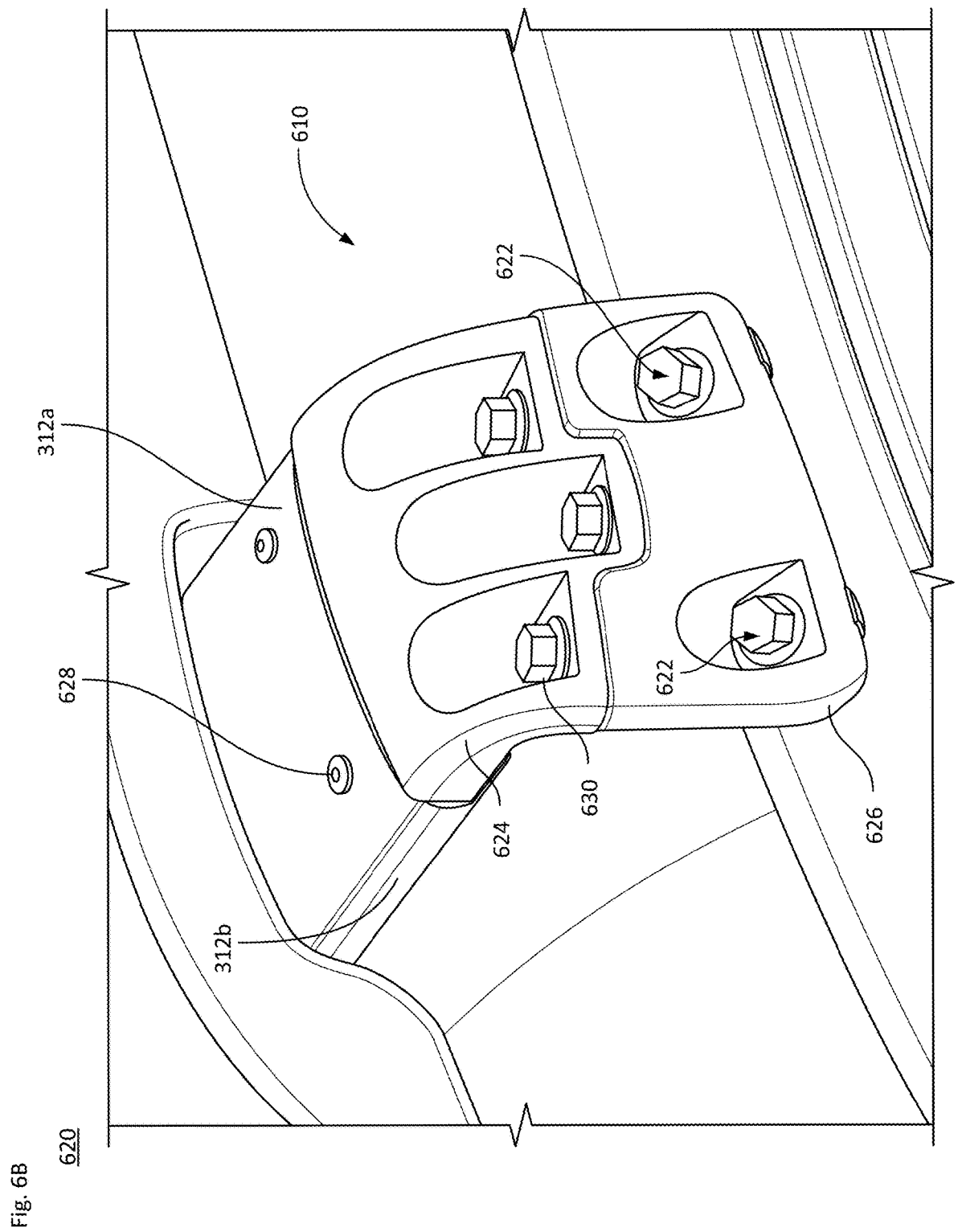

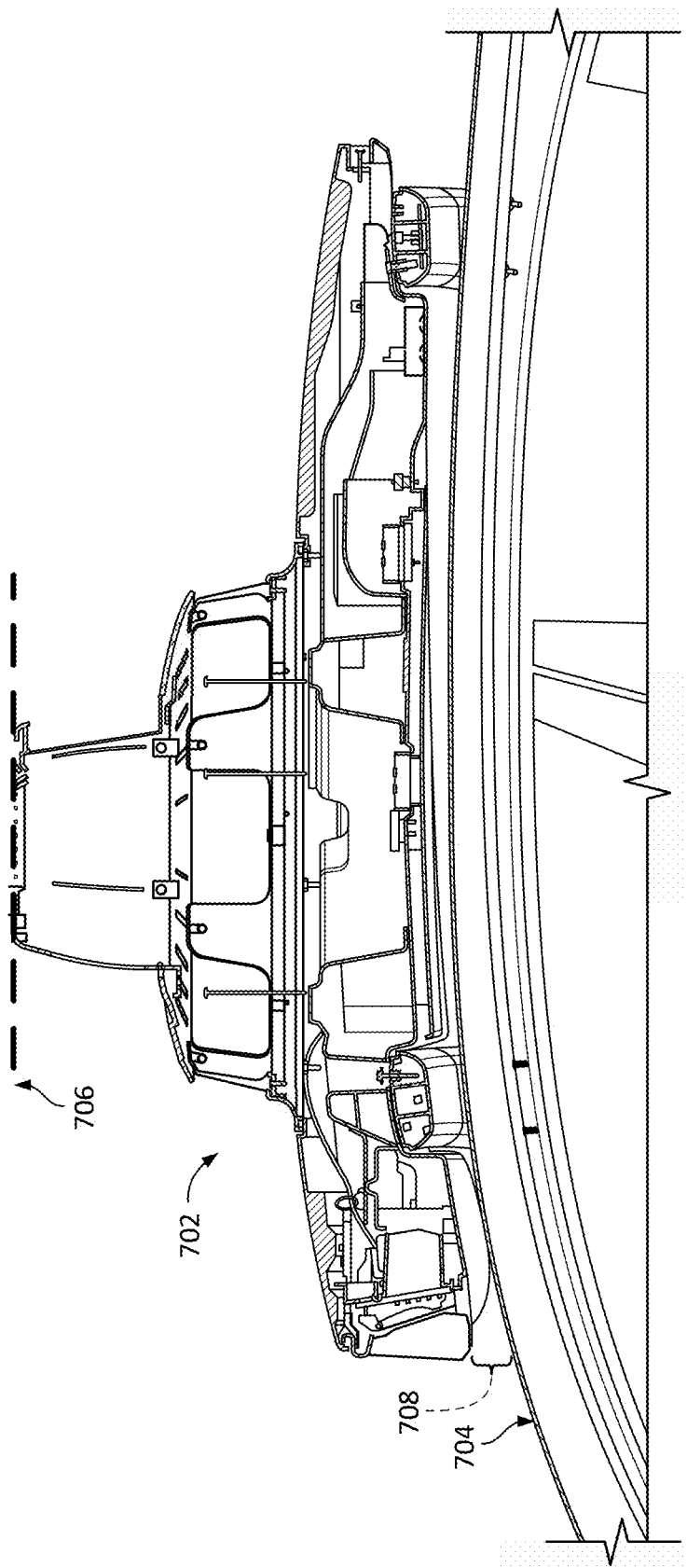

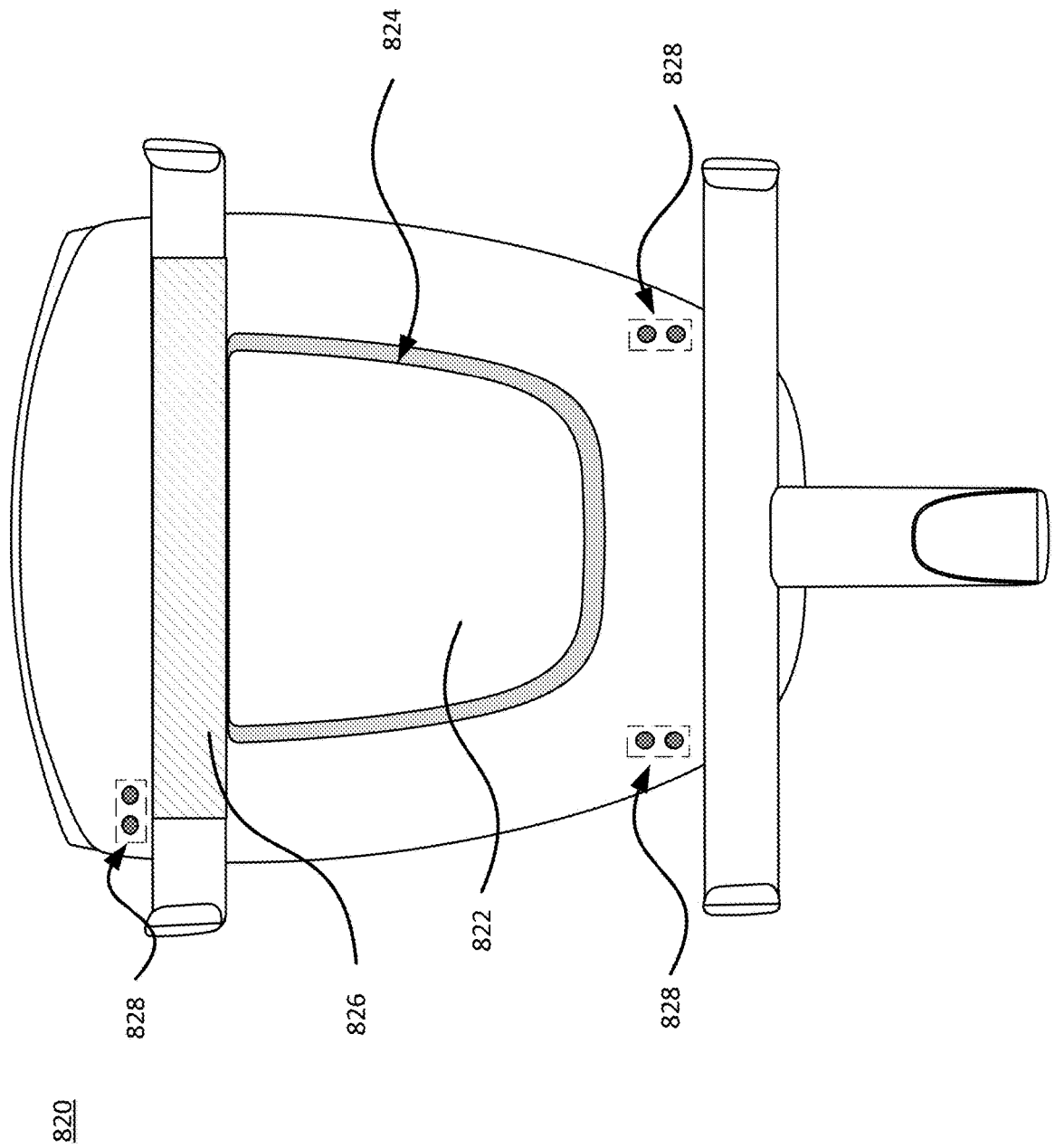

AUTONOMOUS VEHICLE ROOF POD

CROSS-REFERENCE TO RELATED APPLICATIONS

This application claims the benefit of the filing date of U.S. Provisional Application No. 62/879,183, filed Jul. 26, 2019, the entire disclosure of which is incorporated by reference herein. This application is a continuation-in-part of U.S. Design application No. 29/689,690, filed May 1, 2019, and is a continuation-in-part of U.S. Design application No. 29/722,227, filed Jan. 28, 2020, the entire disclosures of which are incorporated by reference herein.

BACKGROUND

Sensor systems for vehicles may be located at different places about the vehicle, including the roof. This can include placing one or more sensor systems on the vehicle's roof. However, mounting such sensor systems directly to the roof may not be advantageous in certain situations. It may also be difficult to route cabling and other items between the vehicle and an external sensor system, especially when a system is fitted onto the vehicle after manufacture.

BRIEF SUMMARY

The technology relates to a roof pod assembly provided on a vehicle configured to operate in one or more self-driving modes. The roof pod assembly is external to the vehicle and sits above the roof of the vehicle, for instance supported by a set of legs such as cross-rails or other support members. The roof pod assembly incorporates various sensors and related equipment to assist with self-driving operation. Some sensors may be arranged in a base housing of the roof pod, while others are located in an elevated dome-type or layer cake structure extending above the base housing. According to one aspect, a conduit member comprising a cabling harness assembly runs wiring and other links between the electrical modules within the roof pod and the main computer or other electrical modules disposed within the vehicle chassis. The conduit member is separate from the support members, and is not load bearing for the roof pod assembly. A pair of support members laterally spans the roof pod assembly, and are affixed to a bottom surface of a base section of the overall assembly. Ventilation and drainage systems may be formed along the base section, so that precipitation and cleaning fluid may be effectively removed away from the sensor modules of the assembly. Each of these aspects includes various features that may operate individually or in conjunction with other features to enhance the operation of the roof pod assembly.

According to one aspect, a roof pod assembly is provided for use in a vehicle configured to operate in an autonomous driving mode. The roof pod assembly comprises a housing, a plurality of sensors, a plurality of support members, and a conduit member. The housing includes a base section and an upper section. The base section has a first side facing towards a roof of the vehicle and a second side opposite the first side. The upper section is disposed along the second side of the base section and extending away from the roof of the vehicle. The plurality of sensors is disposed within or along one or both of the base section and the upper section of the housing. The plurality of sensors is configured to detect objects or environmental conditions external to the vehicle. The plurality of support members is coupled to the first side of the base section. The plurality of support members is configured to elevate the housing above the roof of the vehicle so that the housing does not directly contact a surface of the vehicle. The conduit member includes a harness assembly having a first end affixed to the base section of the housing and a second end configured to affix to a portion of the roof of the vehicle. The harness assembly includes a grommet adapted to receive at least one of electrical wiring, power lines, fluid lines or service cables between the vehicle and the roof pod assembly.

In one example, the conduit member is non-load bearing for the housing of the roof pod assembly. In another example, the grommet includes a main conduit and one or more secondary conduits extending from the main conduit towards the base section of the housing. In this case, the one or more secondary conduits may branch one or more times to create tertiary conduits that couple to specific sensors or other components within the housing.

Each of the plurality of support members may have a lower channel member and an interlocking upper channel member. Here, the lower channel member may comprise aluminum and the upper channel member may be formed as a plastic cover that snap fits onto the lower channel member.

The plurality of support members may provide a minimum clearance of at least 10-50 mm above the roof of the vehicle. The base section of the roof pod assembly may include one or more air inlets and one or more air exhaust vents. In this case, the roof pod assembly may further comprise at least one blower unit configured to pull air into an interior of the roof pod assembly via the one or more air inlets and to expel air from the interior of the roof pod assembly via the one or more air exhaust vents. The roof pod assembly may further comprise a ducting system integrated into the base section of the housing, wherein the ducting system is configured to pass air different regions within the roof pod assembly.

The first side of the base section base section of the roof pod assembly may include a set of transducer receptacles for an acoustical system of the roof pod assembly. The transducer receptacles may be aligned on a plane to provide for triangulation of a sound source external to the vehicle.

In an example, the upper section of the roof pod assembly includes a dome or layer cake structure with one or more sensors disposed about the structure. In another example, the upper section of the roof pod assembly includes a ventilation feature. In a further example, the base section includes an internal drainage system configured to allow precipitation or cleaning fluid to drain through the first side of the base section via one or more openings.

The first side of the base section may comprise a compression molded structure bonded to a lower cover element. In this case, the compression molded structure may be a sheet molding compound.

The roof pod assembly may further comprise a compression ring configured to secure the grommet to an interior surface of the roof of the vehicle. The grommet may include one or more spare service ports.

According to another aspect, a vehicle comprises a perception system configured to detect objects and conditions in an environment external to the vehicle, a control system having one or more processors configured to operate the vehicle in an autonomous driving mode, and a roof pod assembly as described above, wherein the plurality of sensors is part of the perception system.

BRIEF DESCRIPTION OF THE DRAWINGS

FIGS. 4A-D illustrate features of support members and a conduit member for an elevated roof sensor assembly in accordance with aspects of the technology.

FIGS. 5A-D illustrate aspects of the conduit member in accordance with aspects of the technology.

FIGS. 6A-B illustrate components of a roof pod and support structure in accordance with aspects of the technology.

FIG. 7 is a cross-sectional view of a roof pod assembly indicating clearances in accordance with aspects of the technology FIGS. 8A-D illustrate cooling and drainage for a roof pod assembly in accordance with aspects of the technology.

DETAILED DESCRIPTION

While the sensors and other components of a roof pod assembly may be connected to the vehicle's on-board systems by running cabling through one or more legs, according to one aspect of the technology a separate cabling harness assembly is employed. In one example, the cabling harness assembly extends from the rear of the roof pod and couples with a portion of the vehicle's roof Because the cabling harness assembly is separate from the support legs, the housing of the cabling harness assembly does not need to be load bearing, which allows it to be positioned along the roof to make running wiring and other components from and to the vehicle as efficient as possible, and without affecting the structural integrity of the roof Other aspects of the assembly, including the configuration of the support members, ventilation and drainage, may also be beneficially configured to enhance the operation of the roof pod assembly.

Example Vehicle Systems

Figure 1A:
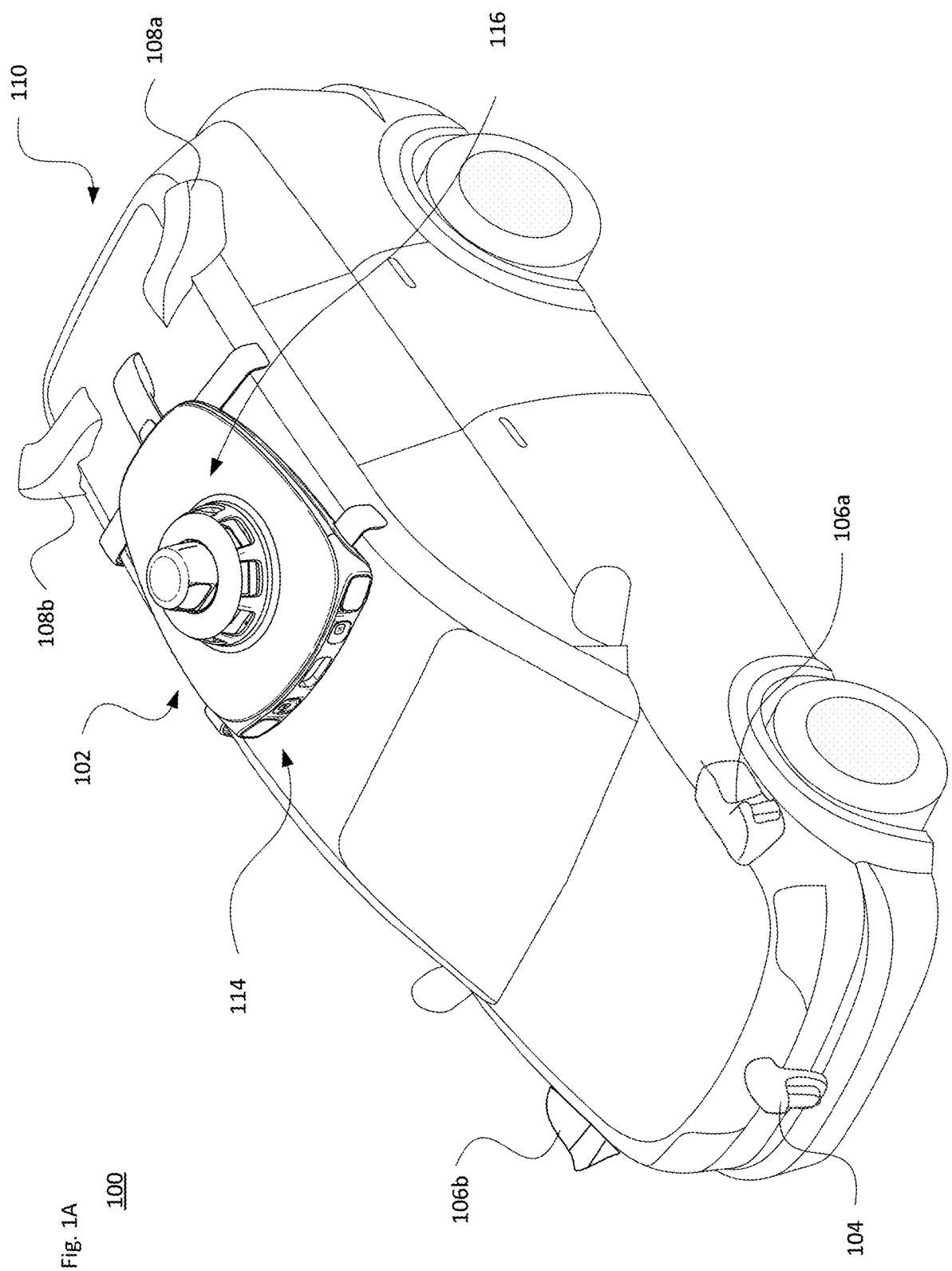
FIGS. 1A-B illustrate example vehicles with an elevated roof sensor assembly in accordance with aspects of the technology.
Figure 1B:
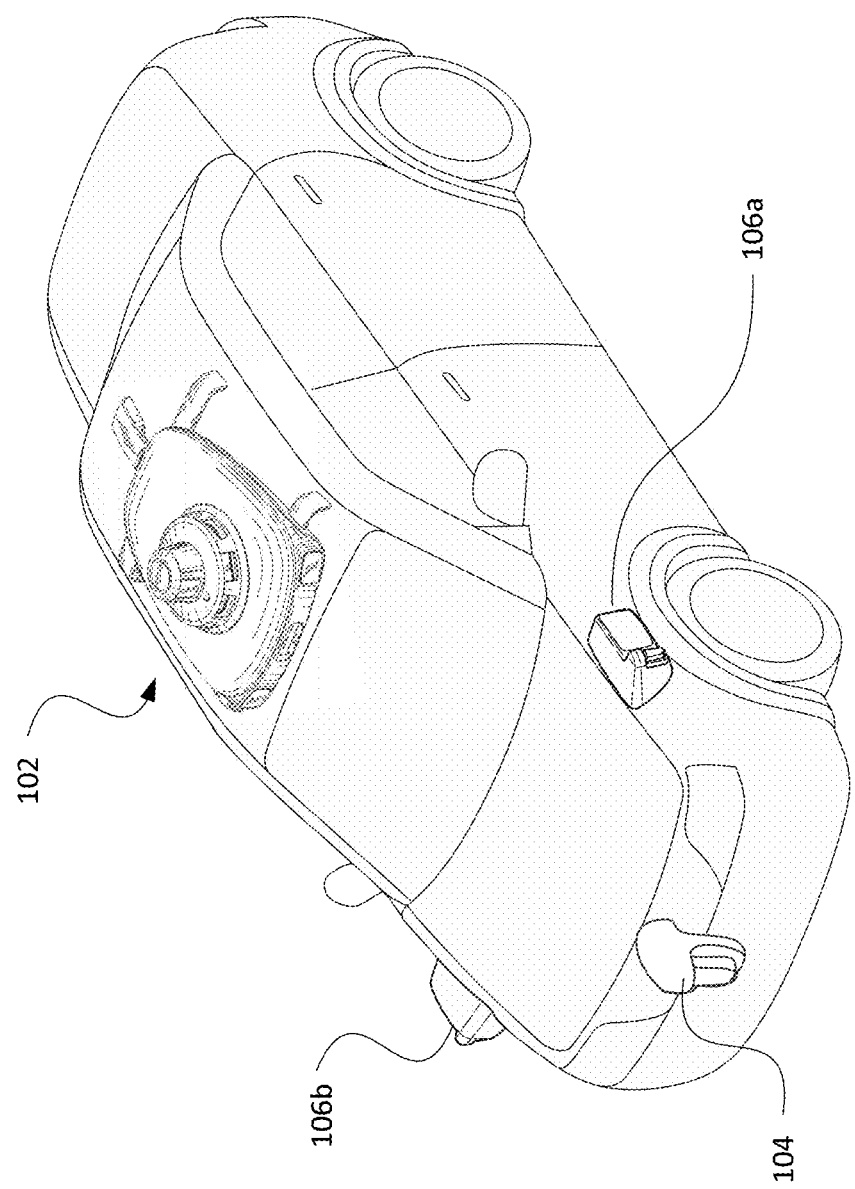

FIG. 1A illustrates a perspective view of an example passenger vehicle 100, such as a minivan, sport utility vehicle (SUV) or other vehicle. FIG. 1B illustrates a perspective view of another example passenger vehicle 150, such as a sedan. The passenger vehicles may include various sensors for obtaining information about the vehicle's external environment. For instance, a roof-top housing unit (roof pod) 102 may include a lidar sensor as well as various cameras (e.g., optical or infrared), radar units, acoustical sensors (e.g., microphone or sonar-type sensor), inertial (e.g., accelerometer, gyroscope, etc.) or other sensors (e.g., positioning sensors such as GPS sensors). Housing 104, located at the front end of vehicle 100, and housings 106a, 106b on the driver's and passenger's sides of the vehicle may each incorporate lidar, radar, camera and/or other sensors. For example, housing 106a may be located in front of the driver's side door along a quarter panel of the vehicle. As shown, the passenger vehicle 100 also includes housings 108a, 108b for radar units, lidar and/or cameras also located towards the rear roof portion of the vehicle. Additional lidar, radar units and/or cameras (not shown) may be located at other places along the vehicle 100. For instance, arrow 110 indicates that a sensor unit (not shown) may be positioned along the rear of the vehicle 100, such as on or adjacent to the bumper.

Arrow 114 indicates that the roof pod 102 as shown includes a base section coupled to the roof of the vehicle. And arrow 116 indicated that the roof pod 102 also includes an upper section raised above the base section. Each of the base section and upper section may house different sensor units configured to obtain information about objects and conditions in the environment around the vehicle. The roof pod 102 and other sensor housings may also be disposed along vehicle 150 of FIG. 1B.

By way of example, each sensor unit may include one or more sensors of the types described above, such as lidar, radar, camera (e.g., optical or infrared), acoustical (e.g., microphone or sonar-type sensor), inertial (e.g., accelerometer, gyroscope, etc.) or other sensors (e.g., positioning sensors such as GPS sensors). While certain aspects of the disclosure may be particularly useful in connection with specific types of vehicles, the vehicle may be different types of vehicle including, but not limited to, cars, cargo vehicles, buses, recreational vehicles, emergency vehicles, construction equipment, etc.

There are different degrees of autonomy that may occur for a vehicle operating in a partially or fully autonomous driving mode. The U.S. National Highway Traffic Safety Administration and the Society of Automotive Engineers have identified different levels to indicate how much, or how little, the vehicle controls the driving. For instance, Level 0 has no automation and the driver makes all driving-related decisions. The lowest semi-autonomous mode, Level 1, includes some drive assistance such as cruise control. Level 2 has partial automation of certain driving operations, while Level 3 involves conditional automation that can enable a person in the driver's seat to take control as warranted. In contrast, Level 4 is a high automation level where the vehicle is able to drive without assistance in select conditions. And Level 5 is a fully autonomous mode in which the vehicle is able to drive without assistance in all situations. The architectures, components, systems and methods described herein can function in any of the semi or fully-autonomous modes, e.g., Levels 1-5, which are referred to herein as autonomous driving modes. Thus, reference to an autonomous driving mode includes both partial and full autonomy.

Figure 2:
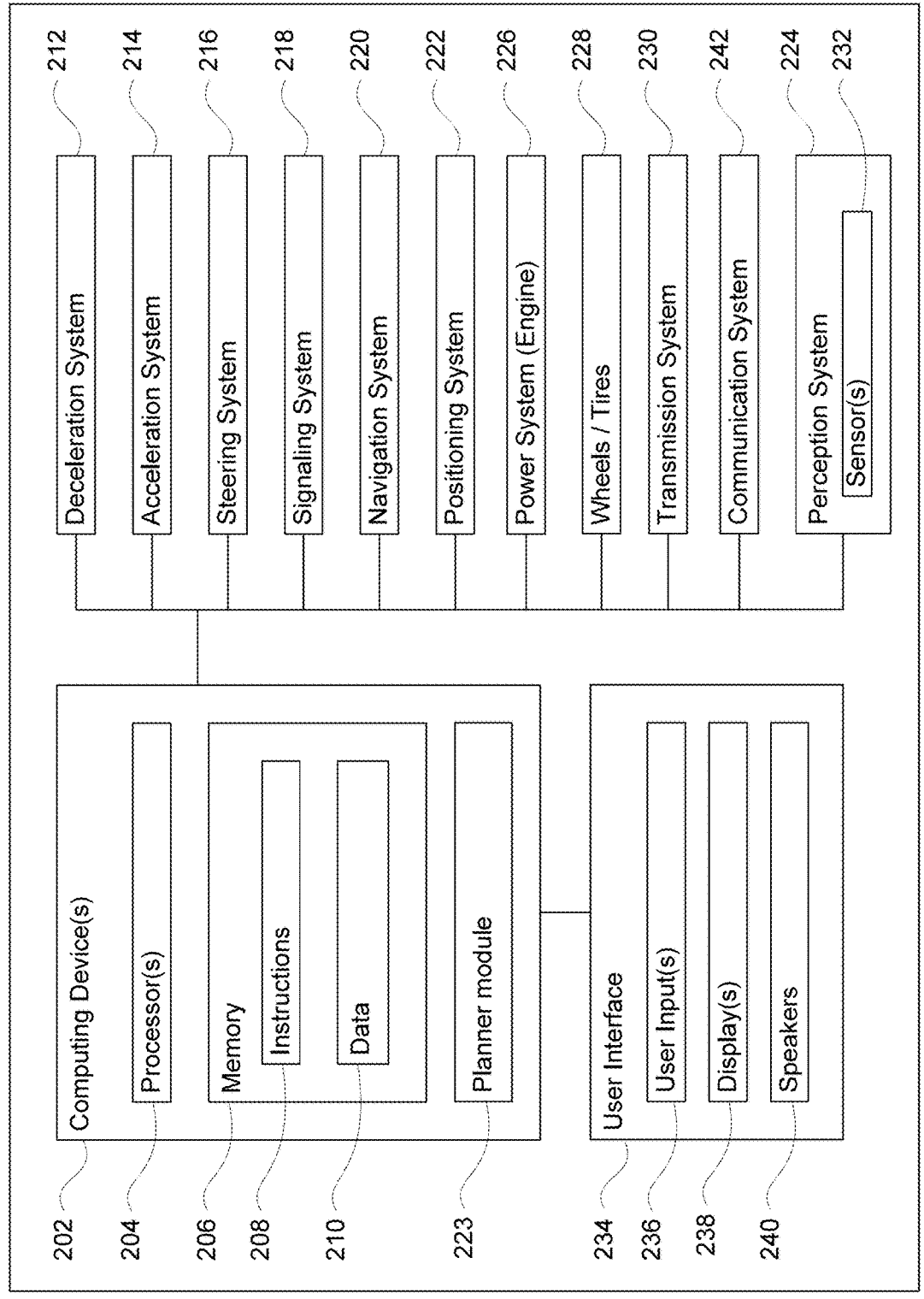
FIG. 2 illustrates components of a vehicle with a roof sensor assembly in accordance with aspects of the technology.
Figure 3A:
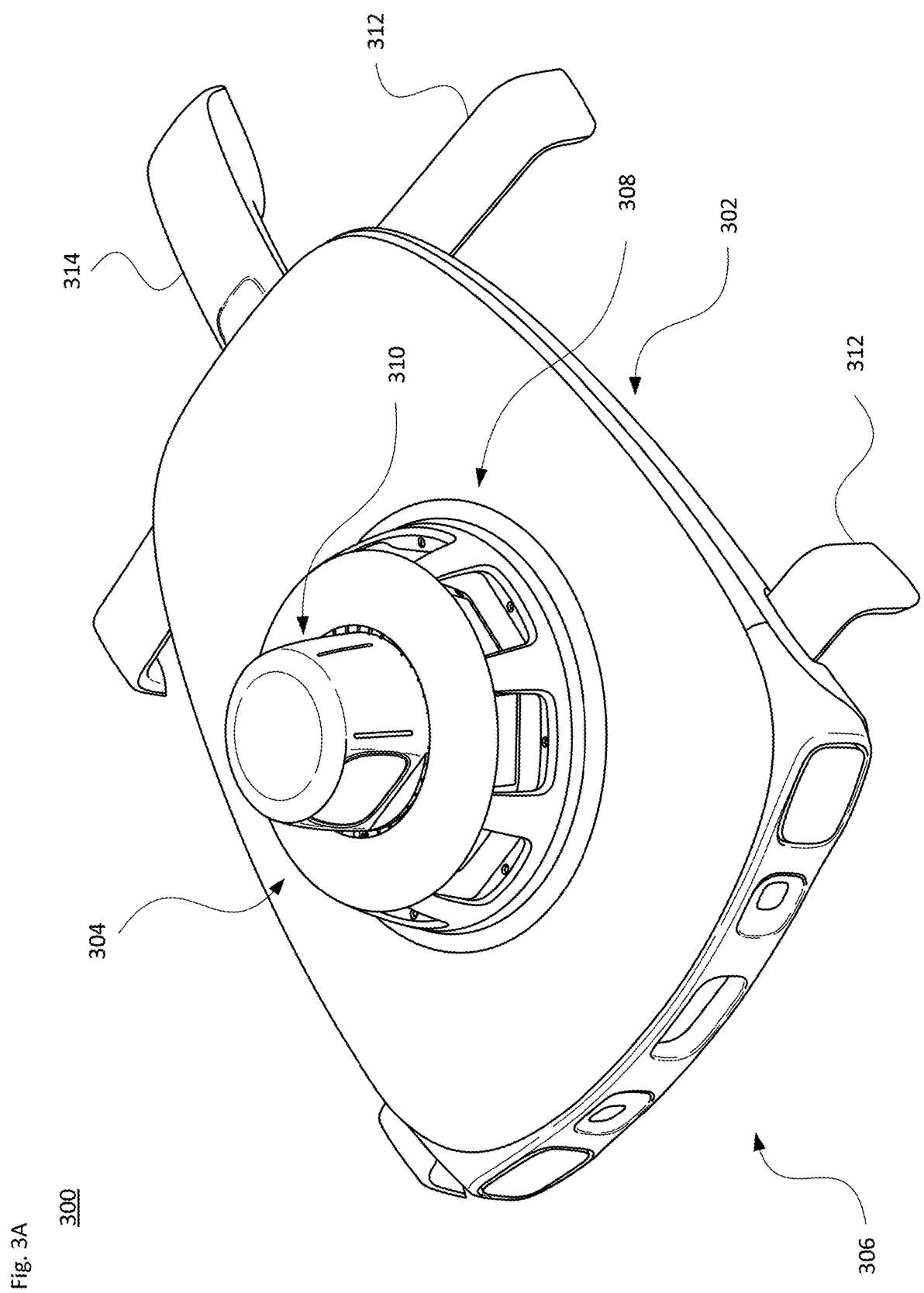
FIGS. 3A-G illustrate views of an elevated roof sensor assembly in accordance with aspects of the technology.
Figure 3B:
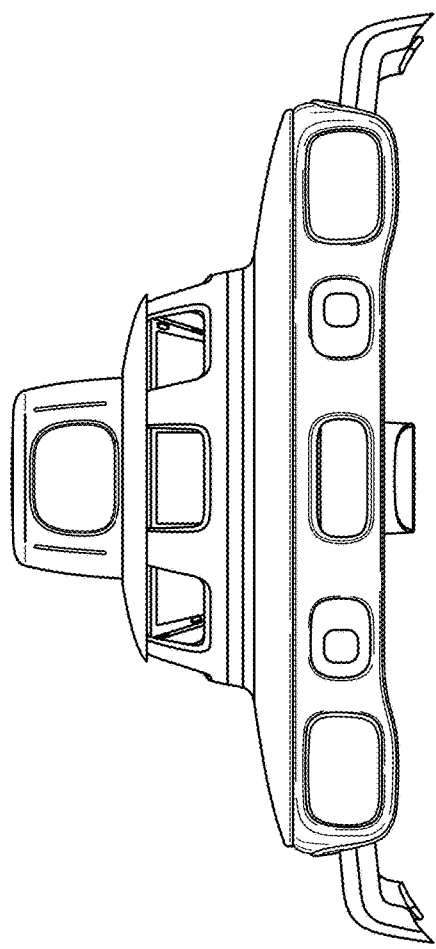
Figure 3C:
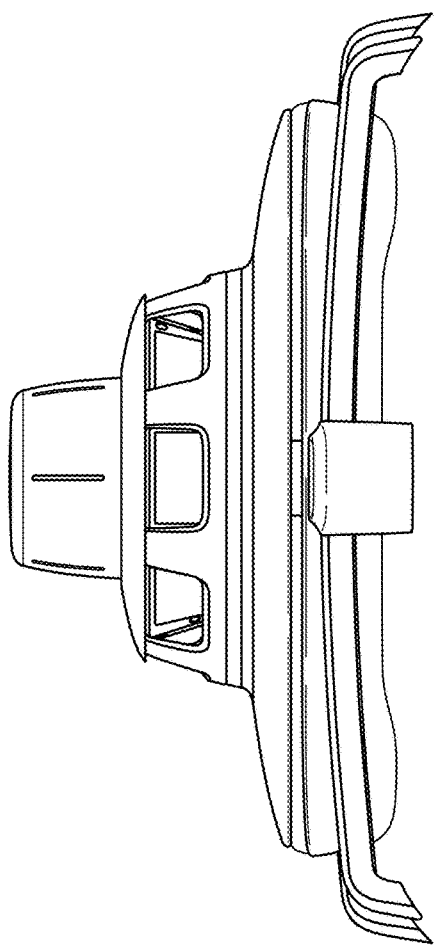
Figure 3D:
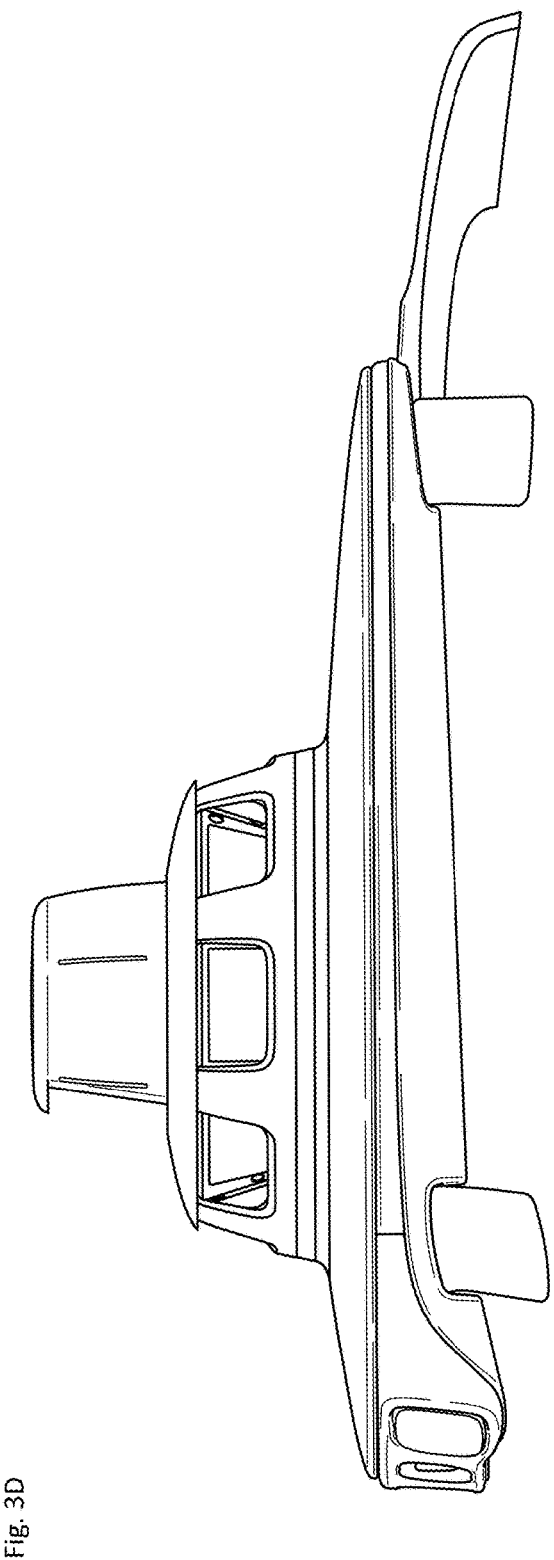
Figure 3E:
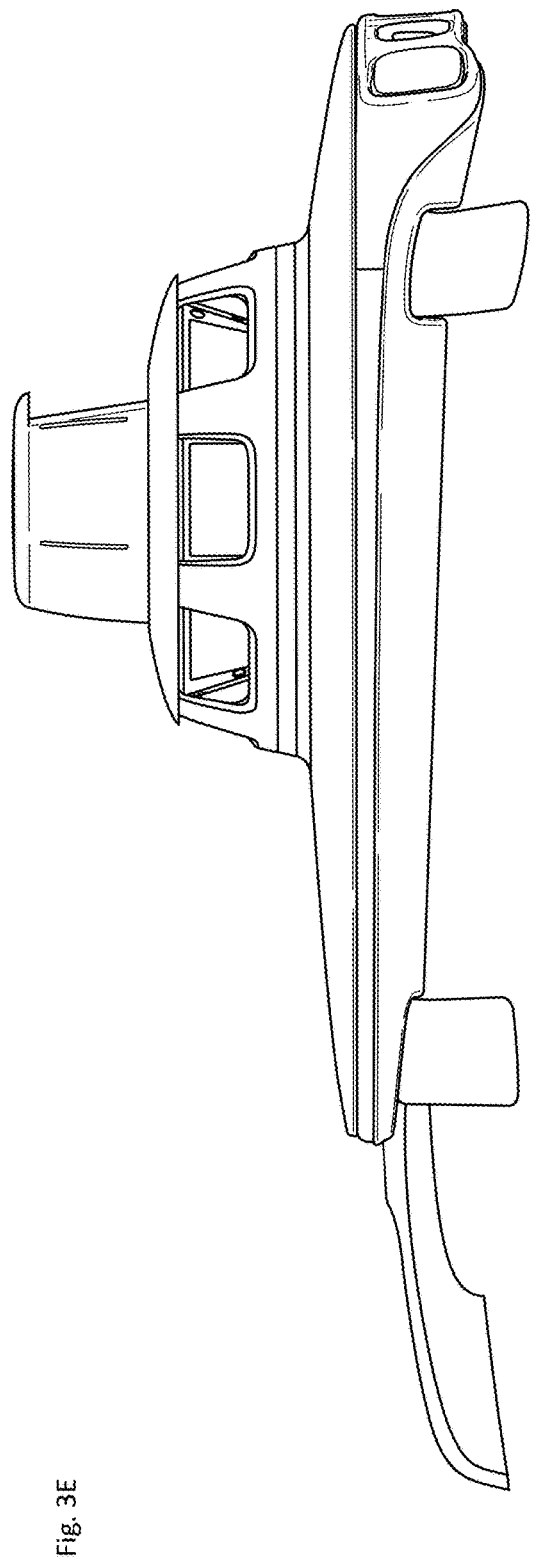
Figure 3F:
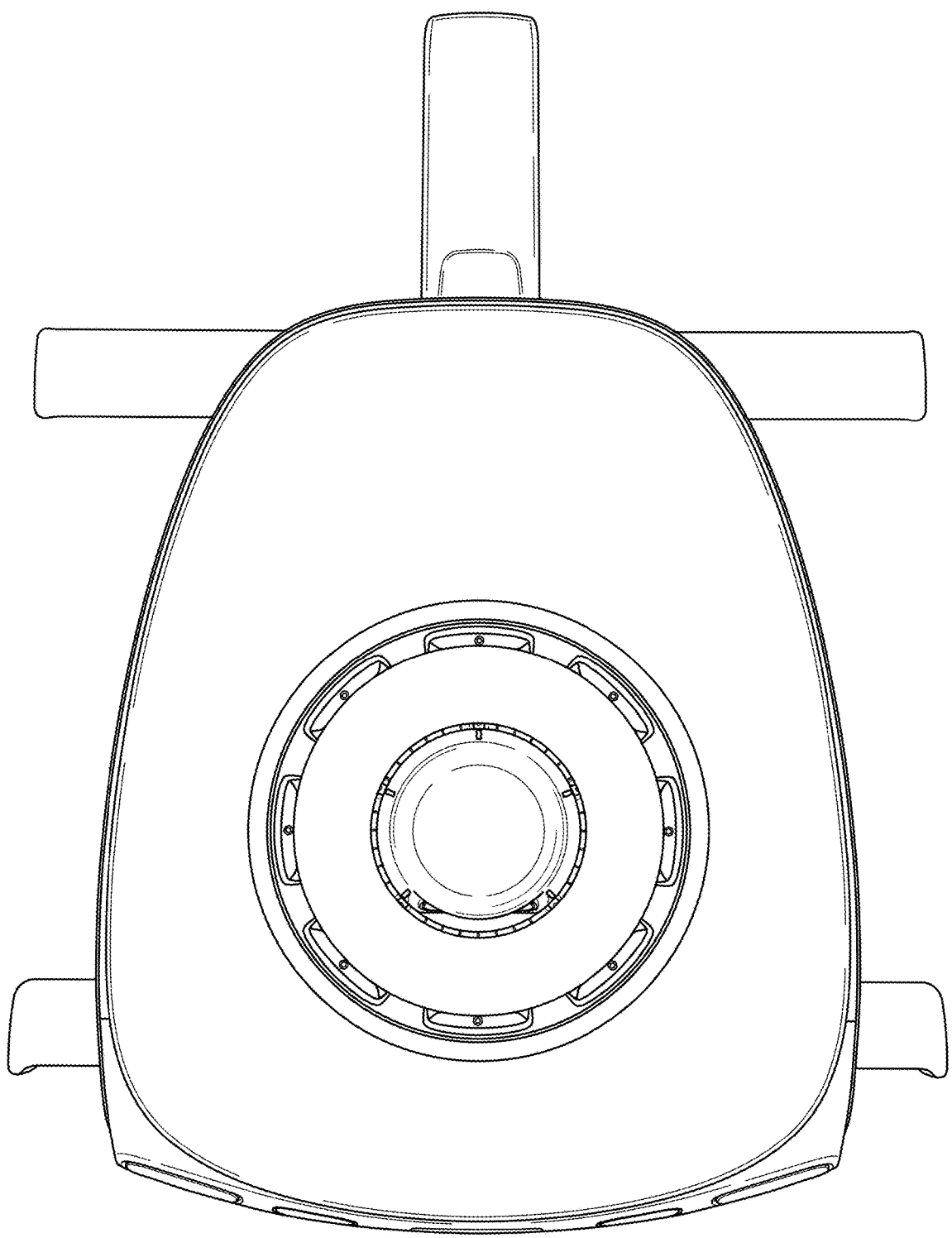
Figure 3G:
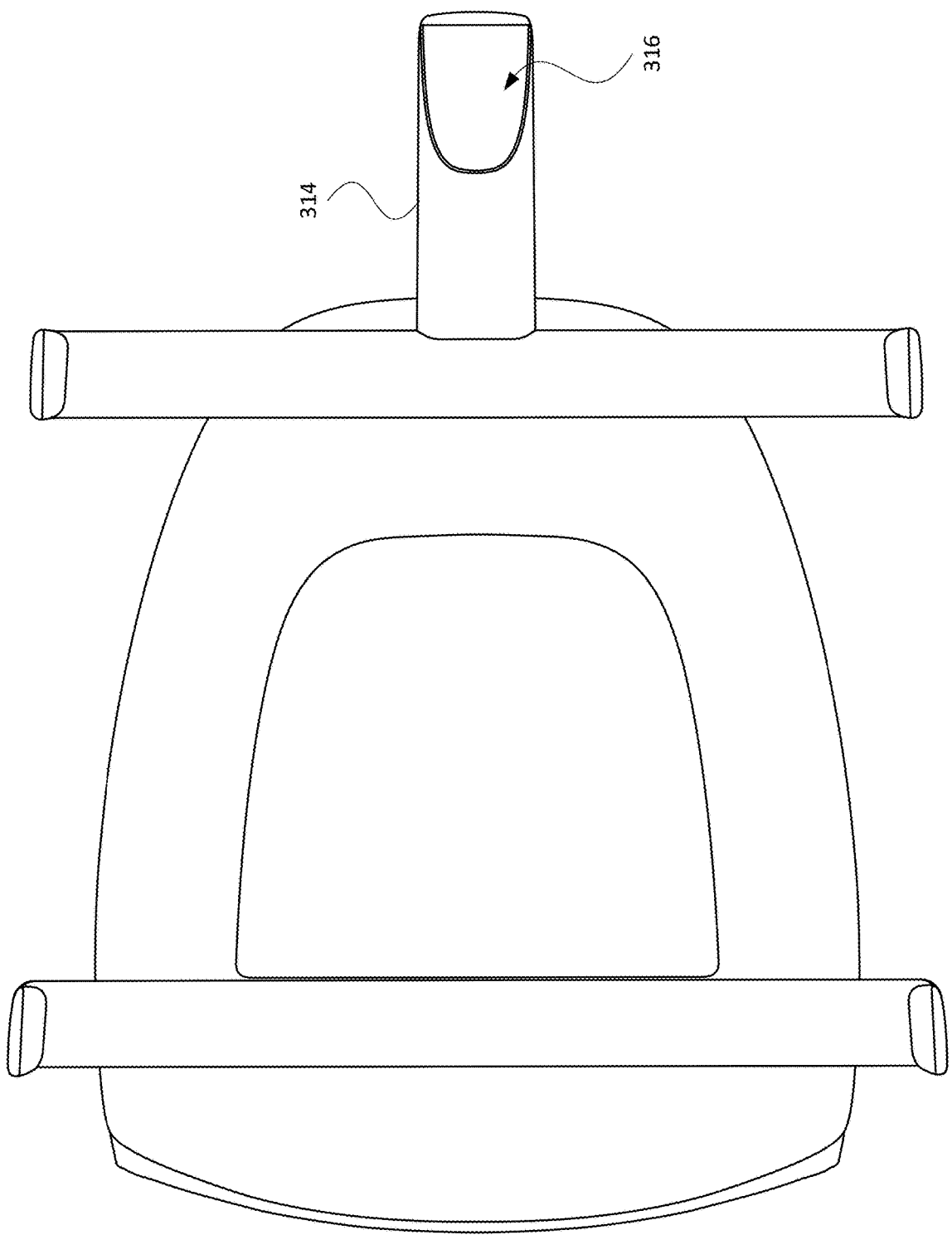

FIG. 2 illustrates a block diagram 200 with various components and systems of an exemplary vehicle, such as passenger vehicle 100 or 150, to operate in an autonomous driving mode. As shown, the block diagram 200 includes one or more computing devices 202, such as computing devices containing one or more processors 204, memory 206 and other components typically present in general purpose computing devices. The memory 206 stores information accessible by the one or more processors 204, including instructions 208 and data 210 that may be executed or otherwise used by the processor(s) 204. The computing system may control overall operation of the vehicle when operating in an autonomous driving mode.

The memory 206 stores information accessible by the processors 204, including instructions 208 and data 210 that may be executed or otherwise used by the processors 204. The memory 206 may be of any type capable of storing information accessible by the processor, including a computing device-readable medium. The memory is a non-transitory medium such as a hard-drive, memory card, optical disk, solid-state, etc. Systems may include different combinations of the foregoing, whereby different portions of the instructions and data are stored on different types of media.

The instructions 208 may be any set of instructions to be executed directly (such as machine code) or indirectly (such as scripts) by the processor(s). For example, the instructions may be stored as computing device code on the computing device-readable medium. In that regard, the terms "instructions", "modules" and "programs" may be used interchangeably herein. The instructions may be stored in object code format for direct processing by the processor, or in any other computing device language including scripts or collections of independent source code modules that are interpreted on demand or compiled in advance. The data 210 may be retrieved, stored or modified by one or more processors 204 in accordance with the instructions 208. In one example, some or all of the memory 206 may be an event data recorder or other secure data storage system configured to store vehicle diagnostics and/or detected sensor data, which may be on board the vehicle or remote, depending on the implementation.

The processors 204 may be any conventional processors, such as commercially available CPUs. Alternatively, each processor may be a dedicated device such as an ASIC or other hardware-based processor. Although FIG. 2 functionally illustrates the processors, memory, and other elements of computing devices 202 as being within the same block, such devices may actually include multiple processors, computing devices, or memories that may or may not be stored within the same physical housing. Similarly, the memory 206 may be a hard drive or other storage media located in a housing different from that of the processor(s) 204. Accordingly, references to a processor or computing device will be understood to include references to a collection of processors or computing devices or memories that may or may not operate in parallel.

In one example, the computing devices 202 may form an autonomous driving computing system incorporated into vehicle 100. The autonomous driving computing system may be capable of communicating with various components of the vehicle. For example, the computing devices 202 may be in communication with various systems of the vehicle, including a driving system including a deceleration system 212 (for controlling braking of the vehicle), acceleration system 214 (for controlling acceleration of the vehicle), steering system 216 (for controlling the orientation of the wheels and direction of the vehicle), signaling system 218 (for controlling turn signals), navigation system 220 (for navigating the vehicle to a location or around objects) and a positioning system 222 (for determining the position of the vehicle, e.g., including the vehicle's pose). The autonomous driving computing system may employ a planner module 223, in accordance with the navigation system 220, the positioning system 222 and/or other components of the system, e.g., for determining a route from a starting point to a destination or for making modifications to various driving aspects in view of current or expected traction conditions.

The computing devices 202 are also operatively coupled to a perception system 224 (for detecting objects in the vehicle's environment), a power system 226 (for example, a battery and/or gas or diesel powered engine) and a transmission system 230 in order to control the movement, speed, etc., of the vehicle in accordance with the instructions 208 of memory 206 in an autonomous driving mode which does not require or need continuous or periodic input from a passenger of the vehicle. Some or all of the wheels/tires 228 are coupled to the transmission system 230, and the computing devices 202 may be able to receive information about tire pressure, balance and other factors that may impact driving in an autonomous mode.

The computing devices 202 may control the direction and speed of the vehicle, e.g., via the planner module 223, by controlling various components. By way of example, computing devices 202 may navigate the vehicle to a destination location completely autonomously using data from the map information and navigation system 220. Computing devices 202 may use the positioning system 222 to determine the vehicle's location and the perception system 224 to detect and respond to objects when needed to reach the location safely. In order to do so, computing devices 202 may cause the vehicle to accelerate (e.g., by increasing fuel or other energy provided to the engine by acceleration system 214), decelerate (e.g., by decreasing the fuel supplied to the engine, changing gears, and/or by applying brakes by deceleration system 212), change direction (e.g., by turning the front or other wheels of vehicle 100 by steering system 216), and signal such changes (e.g., by lighting turn signals of signaling system 218). Thus, the acceleration system 214 and deceleration system 212 may be a part of a drivetrain or other type of transmission system 230 that includes various components between an engine of the vehicle and the wheels of the vehicle. Again, by controlling these systems, computing devices 202 may also control the transmission system 230 of the vehicle in order to maneuver the vehicle autonomously.

Navigation system 220 may be used by computing devices 202 in order to determine and follow a route to a location. In this regard, the navigation system 220 and/or memory 206 may store map information, e.g., highly detailed maps that computing devices 202 can use to navigate or control the vehicle. As an example, these maps may identify the shape and elevation of roadways, lane markers, intersections, crosswalks, speed limits, traffic signal lights, buildings, signs, real time traffic information, vegetation, or other such objects and information. The lane markers may include features such as solid or broken double or single lane lines, solid or broken lane lines, reflectors, etc. A given lane may be associated with left and/or right lane lines or other lane markers that define the boundary of the lane. Thus, most lanes may be bounded by a left edge of one lane line and a right edge of another lane line.

The perception system 224 includes sensors 232 for detecting objects external to the vehicle. The detected objects may be other vehicles, obstacles in the roadway, traffic signals, signs, trees, etc. The sensors may 232 may also detect certain aspects of weather conditions, such as snow, rain or water spray, or puddles, ice or other materials on the roadway.

By way of example only, the perception system 224 may include one or more light detection and ranging (lidar) sensors, radar units, cameras (e.g., optical imaging devices, with or without a neutral-density filter (ND) filter), positioning sensors (e.g., gyroscopes, accelerometers and/or other inertial components), infrared sensors, acoustical sensors (e.g., microphones or sonar transducers), and/or any other detection devices that record data which may be processed by computing devices 202. Such sensors of the perception system 224 may detect objects outside of the vehicle and their characteristics such as location, orientation, size, shape, type (for instance, vehicle, pedestrian, bicyclist, etc.), heading, speed of movement relative to the vehicle, etc., as well as environmental conditions around the vehicle. The perception system 224 may also include other sensors within the vehicle to detect objects and conditions within the vehicle, such as in the passenger compartment. For instance, such sensors may detect, e.g., one or more persons, pets, packages, etc., as well as conditions within and/or outside the vehicle such as temperature, humidity, etc. Still further sensors 232 of the perception system 224 may measure the rate of rotation of the wheels 228, an amount or a type of braking by the deceleration system 212, and other factors associated with the equipment of the vehicle itself.

The raw data obtained by the sensors can be processed by the perception system 224 and/or sent for further processing to the computing devices 202 periodically or continuously as the data is generated by the perception system 224. Computing devices 202 may use the positioning system 222 to determine the vehicle's location and perception system 224 to detect and respond to objects when needed to reach the location safely, e.g., via adjustments made by planner module 223, including adjustments in operation to deal with occlusions and other issues. In addition, the computing devices 202 may perform calibration of individual sensors, all sensors in a particular sensor assembly, or between sensors in different sensor assemblies or other physical housings.

As illustrated in FIGS. 1A-B, certain sensors of the perception system 224 may be incorporated into one or more sensor assemblies or housings. In one example, these may be integrated into front, rear or side perimeter sensor assemblies around the vehicle. In another example, other sensors may be part of the roof-top housing (roof pod) 102. The computing devices 202 may communicate with the sensor assemblies located on or otherwise distributed along the vehicle. Each assembly may have one or more types of sensors such as those described above.

Returning to FIG. 2, computing devices 202 may include all of the components normally used in connection with a computing device such as the processor and memory described above as well as a user interface subsystem 234. The user interface subsystem 234 may include one or more user inputs 236 (e.g., a mouse, keyboard, touch screen and/or microphone) and one or more display devices 238 (e.g., a monitor having a screen or any other electrical device that is operable to display information). In this regard, an internal electronic display may be located within a cabin of the vehicle (not shown) and may be used by computing devices 202 to provide information to passengers within the vehicle. Other output devices, such as speaker(s) 240 may also be located within the passenger vehicle.

The vehicle may also include a communication system 242. For instance, the communication system 242 may also include one or more wireless configurations to facilitate communication with other computing devices, such as passenger computing devices within the vehicle, computing devices external to the vehicle such as in another nearby vehicle on the roadway, and/or a remote server system. The network connections may include short range communication protocols such as Bluetooth™, Bluetooth™ low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

Example Implementations

FIGS. 3A-G illustrate one example of a roof pod assembly 300. As indicated with regard to roof pod 102 of FIG. 1A, the roof pod assembly 300 includes a base section 302 arranged closer to the roof of the vehicle and an upper section 304 sitting above the base section and remote from the vehicle roof. Each of these sections may include various sensor suites of the types described above, local processing systems (e.g., to process raw data from the sensors) and other equipment such as wipers or other cleaning systems to clean the various sensors. By way of example only, the front side 306 of the base section 302 may include image sensors (e.g., optical cameras) and/or radar sensors arranged to detect objects in front of the vehicle as it drives in an autonomous mode.

The elevated upper section 304 may include different types of sensors arranged in different tiers or configurations, such as part of a dome-type or layer-cake type arrangement. By way of example, a series of image sensors (e.g., optical cameras) may be arranged in a circular or other configuration in a first part 308 of the upper section, such as to provide overlapping fields of view around the vehicle. And a second part 310 of the upper section may include one or more lidar units or other sensors, which may be configured to rotate 360° or to otherwise provide a full field of view around the vehicle. In this example, the first part 308 is mounted on an upper surface of the base section 302, and the second part 310 is disposed on top of the first part 308.

As seen in FIGS. 3A-G, the roof pod assembly 300 also includes a pair of legs or other support members 312. The support members 312 are affixed to a bottom surface of the base section 302, and are configured to connect along the left and right sides of the roof of the vehicle, for instance as illustrated in FIGS. 1A and 1B. The support members 312 are arranged so that the bottom surface of the base section 302 does not rest on or directly contact the vehicle roof. The roof pod assembly 300 further includes a conduit member 314.

The front support member 312 may be affixed adjacent or along the left/right A pillars of the vehicle frame, while the rear support member 312 may be affixed adjacent or along the left/right C (or D) pillars of the vehicle frame. Because the side roof arches of the vehicle frame spanning the A, B and C (and/or D) pillars are typically formed of high strength steel or other rigid materials, it may be infeasible or impractical to run cabling, cooling lines and other conduits along these regions of the roof without impacting structural integrity, or without adding additional clearance requirements within or above the roof. This can be especially true for assemblies that are fitted to the roof after the vehicle has been manufactured. Thus, in many vehicle configurations it may not be possible to run conduits between the roof pod assembly and the vehicle through the support members.

Therefore, because it may not be feasible to connect the sensors and other components of the roof pod assembly 300 to the vehicle's on-board systems (e.g., computing devices 202) by running cabling through one or more legs of the support members 312, according to one aspect of the technology a separate cabling harness assembly distinct from the support members 312 is employed as part of the conduit member 314. As shown in FIGS. 3A-G, the conduit member 314 extends from the rear of the base section 302 of the roof pod and is configured to couple with a portion of the vehicle's roof (see FIGS. 1A-B). From this point along the roof, the individual cables, conduits and other connections may be run to the appropriate devices located within the vehicle.

Because the cabling harness assembly of the conduit member 314 is distinct from the support members 312, the housing of the cabling harness assembly does not need to be load bearing for the roof pod assembly. As shown in the bottom view of FIG. 3G, the end of the conduit member 314 remote from the base section 302 has an enlarged opening 316, through which wiring, conduits and other links of the cabling harness assembly are run between the sensors and other components of the roof pod assembly and the processing system and other modules of the vehicle. According to one aspect, since the harness assembly housing is non-load bearing, its design can be driven more from an aesthetic standpoint, provided the harness packages inside it can change shape depending on style preferences. In contrast, if the cable harness housing were required to be structural, the materials and/or shape may need to be optimized for stiffness and strength rather than for aesthetics.

Figure 4A:
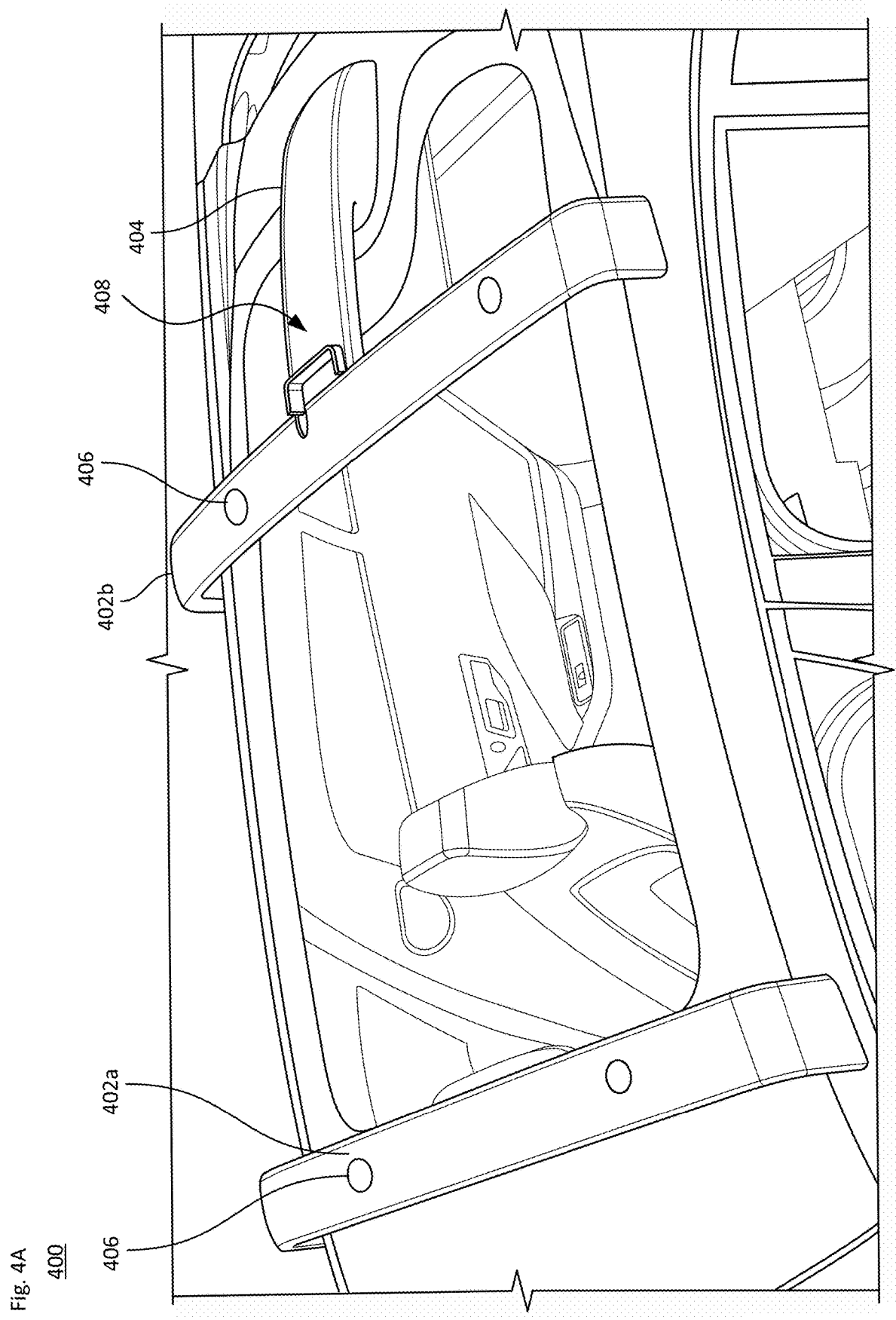

FIG. 4A is a perspective view 400 showing a front support member 402*a*, a rear support member 402*b*, and a conduit member 404, with the other portions of the roof pod assembly omitted for clarity. In this example, a substantial portion of the roof may be glass or some other transparent material, which can significantly constrain locations through which the conduits and other connections can be run between the vehicle and the roof pod assembly.

As shown by circular elements 406, the front and rear support members 402*a,b* may be mechanically secured to the affixed to the bottom surface of the base section of the roof pod assembly by fasteners such as bolts. In other examples, the support members 402 may be attached to the bottom surface via rivets or bonding. The conduit member 404 is shown in FIG. 4A, bottom view 420 of FIG. 4B (with the rest of the roof pod and the vehicle omitted for clarity), and perspective view 440 of FIG. 4C (illustrating the base section of the roof pod) as having a front end 408 adjacent to the rear support member 402*b*. The front end 408 includes an opening for the cable harness assembly of the conduit member to extend into the base section of the roof pod assembly. According to one aspect of the technology, the conduit member 404 may not be structurally supported at all by the rear support member 402*b* and/or may not provide structural support to the roof pod unit itself (e.g., the base section and the upper section of the assembly). In other scenarios, the conduit member 404 may provide some structural support to the roof pod assembly in conjunction with the front and rear support members.

Figure 4C:
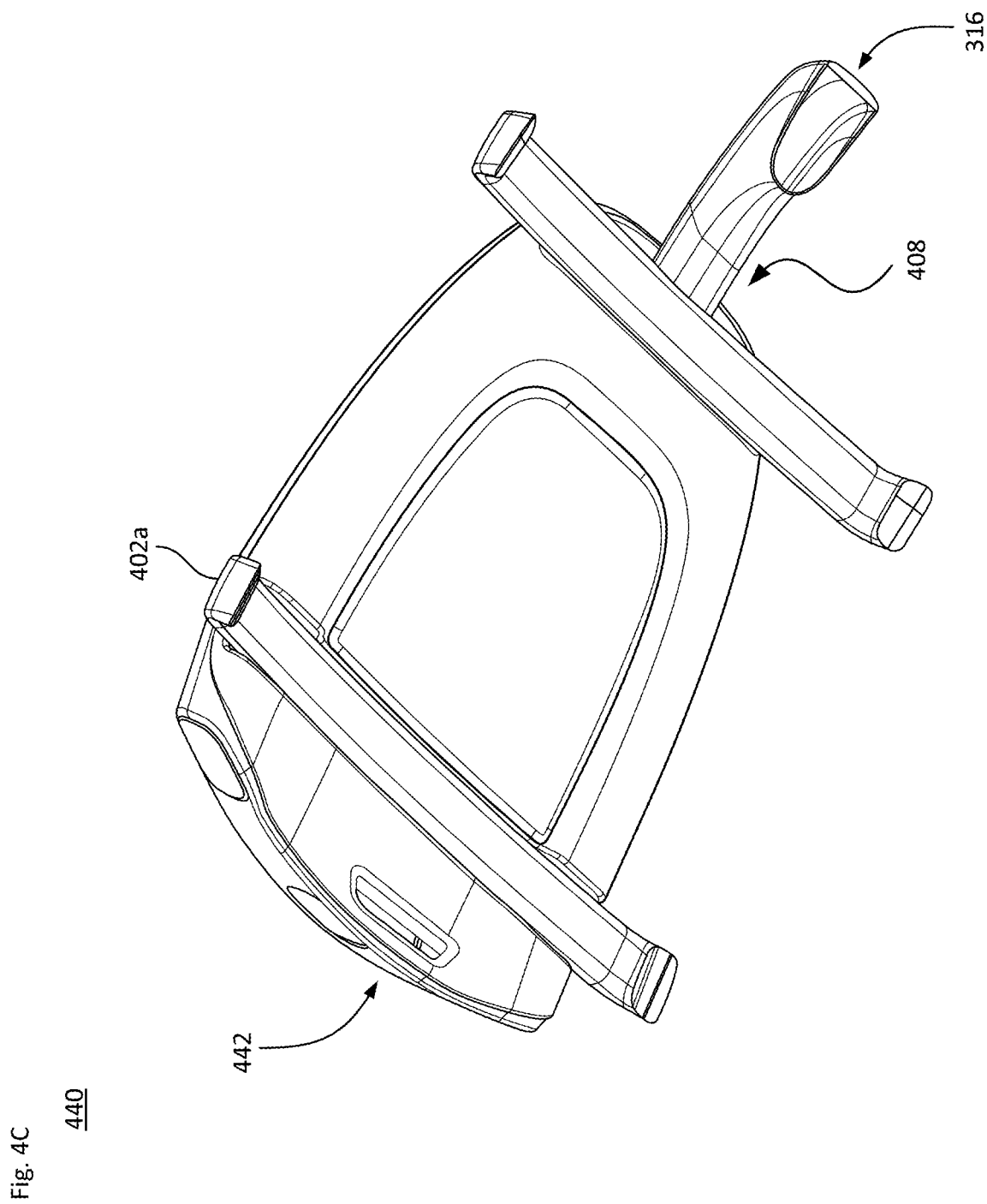
Figure 4D:
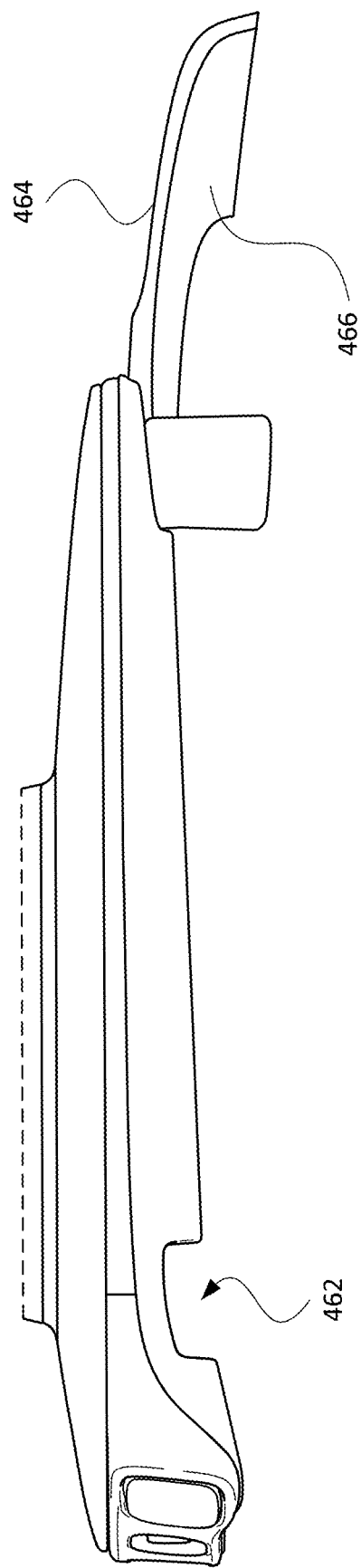
Figure 8A:
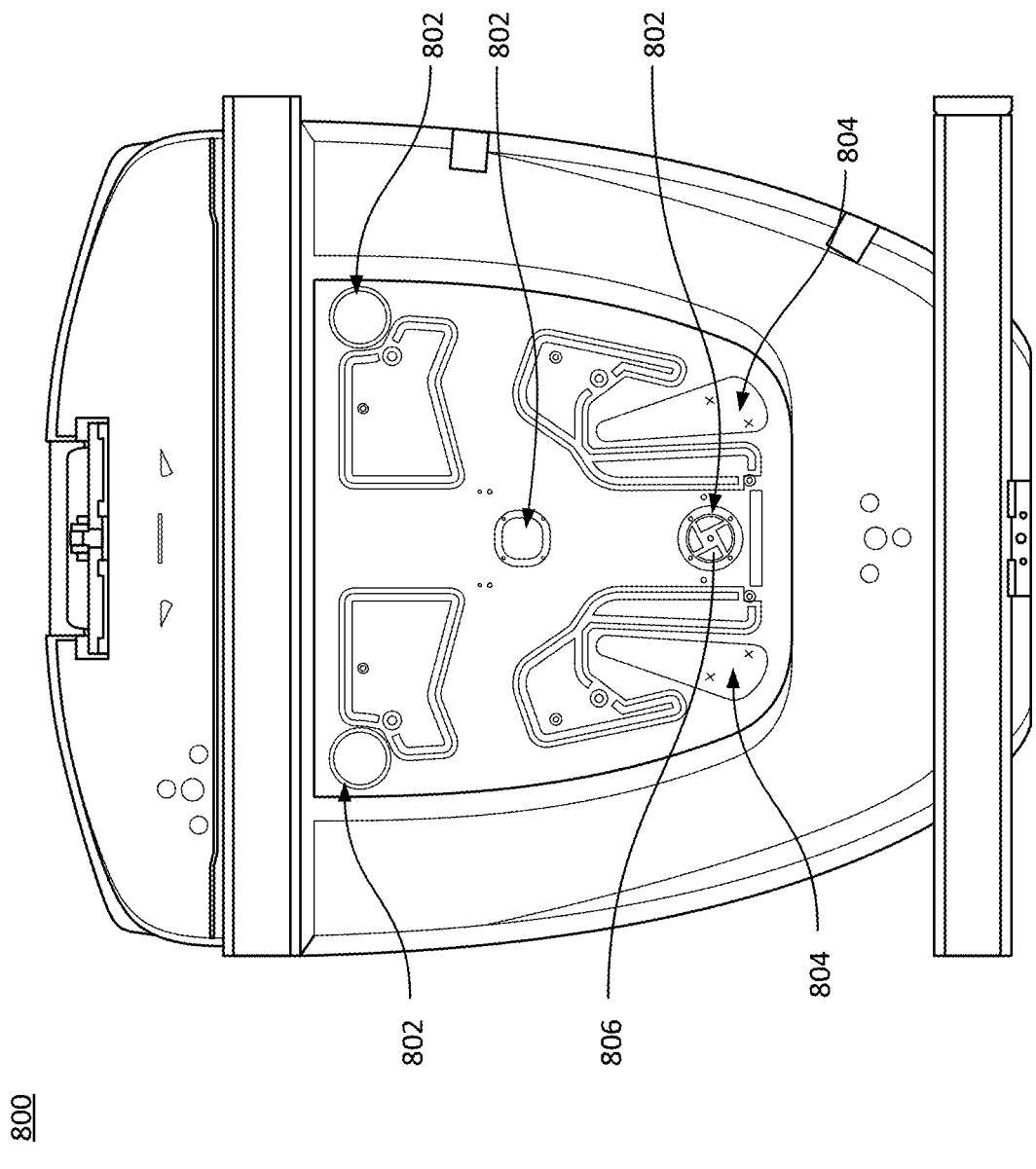

As seen in the perspective view of FIG. 4C (and the side views of FIGS. 3D-E), the front support member 402*a* may be at least partly received within a slot or other channel along a front area of the bottom surface of the base section of the roof pod assembly. A cover (not shown; see 826 in FIG. 8B) may at least partly cover the exposed portion of the front support member 402*a* beneath the base section. In addition, as shown in this example, the base section may include a drainage port 442, such as below the front end of the base section. FIG. 4D illustrates a partial side view 460 of a roof pod assembly with the upper section 304 omitted as indicated by the dashed line. Here, the front support member 402*a* has also been omitted, and channel 462 along the front area of the base section can be seen. Also shown in this view is that the conduit member includes an upper housing 464 and a lower housing 466.

Figure 5A:
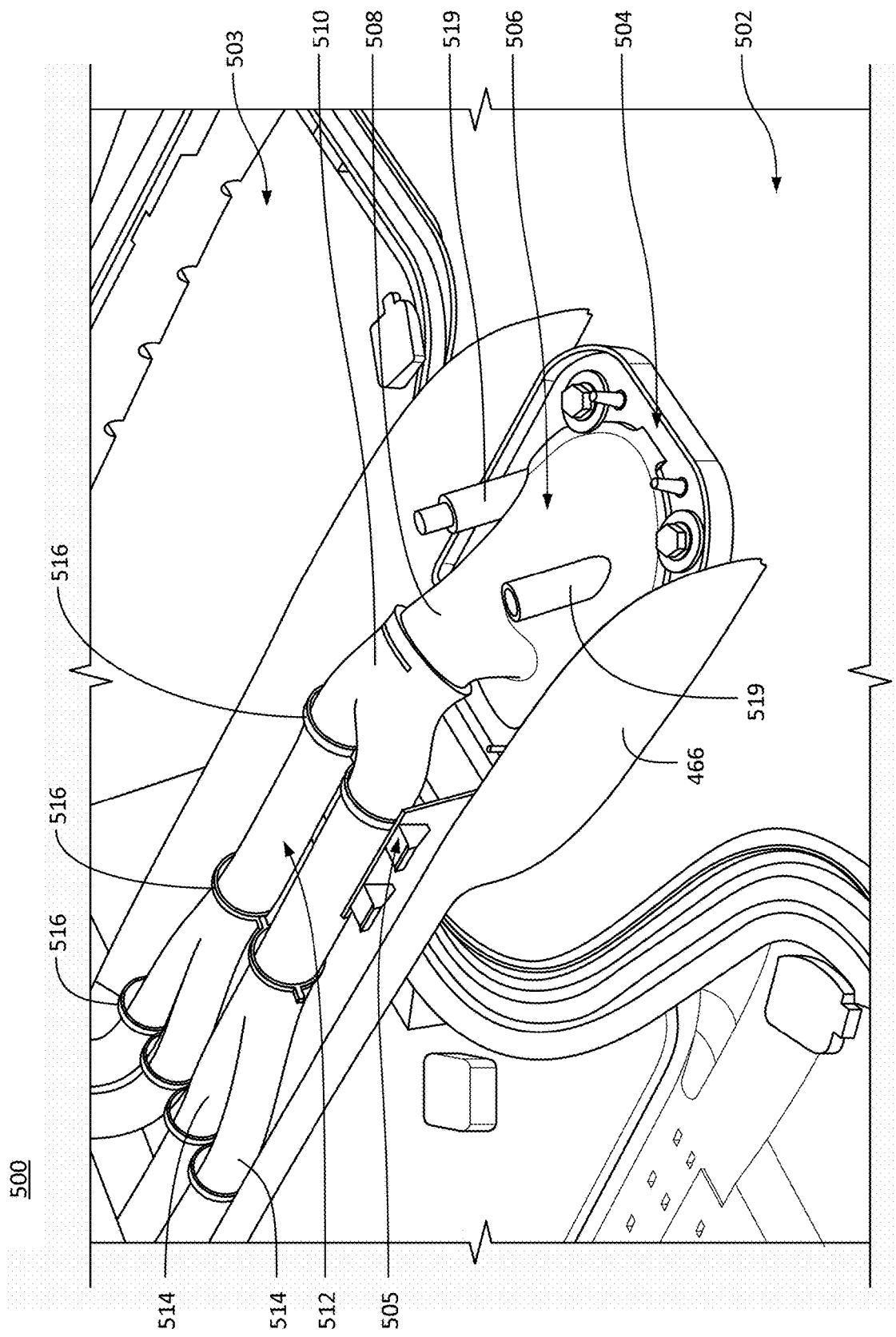
Figure 5B:
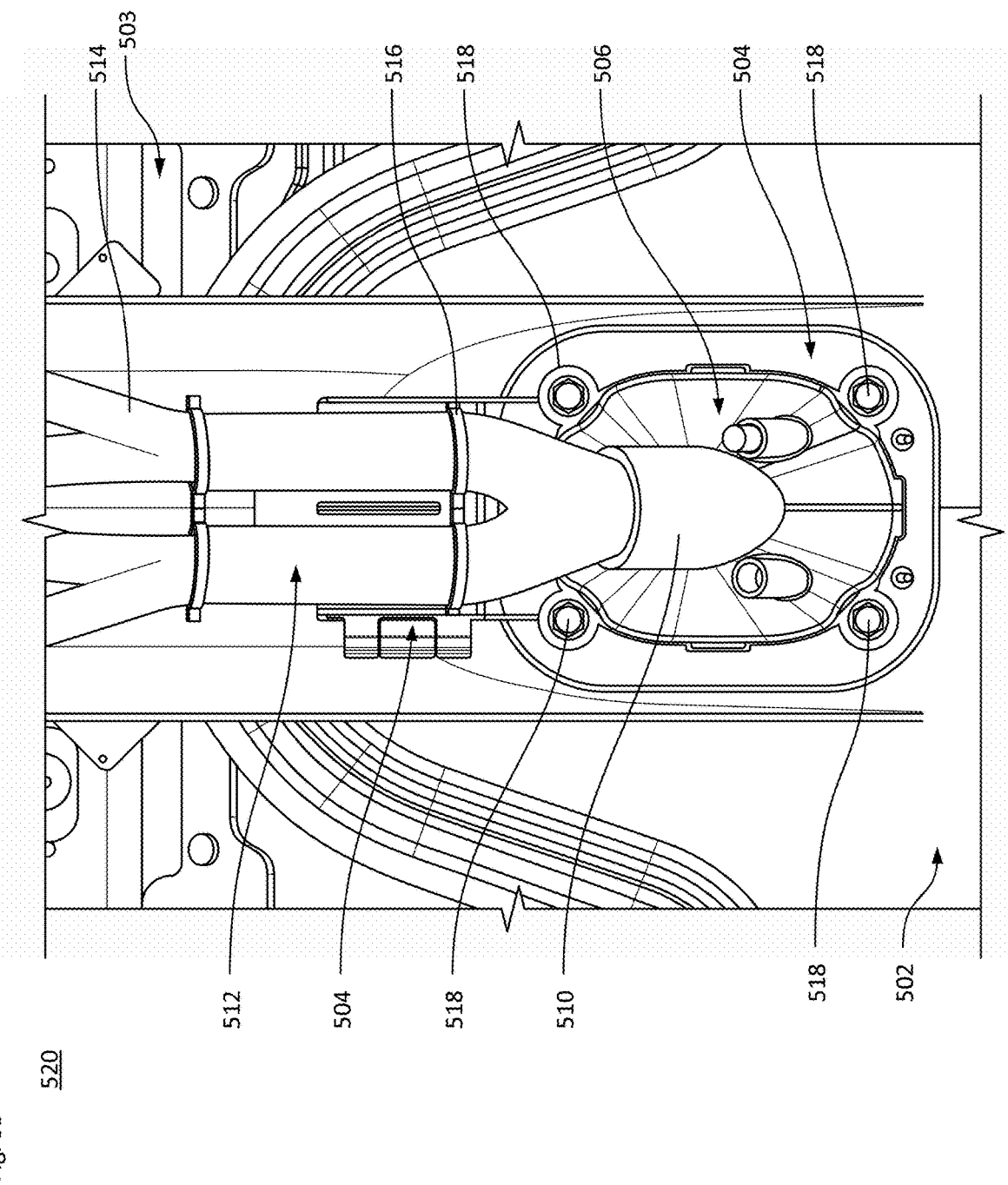
Figure 5D:
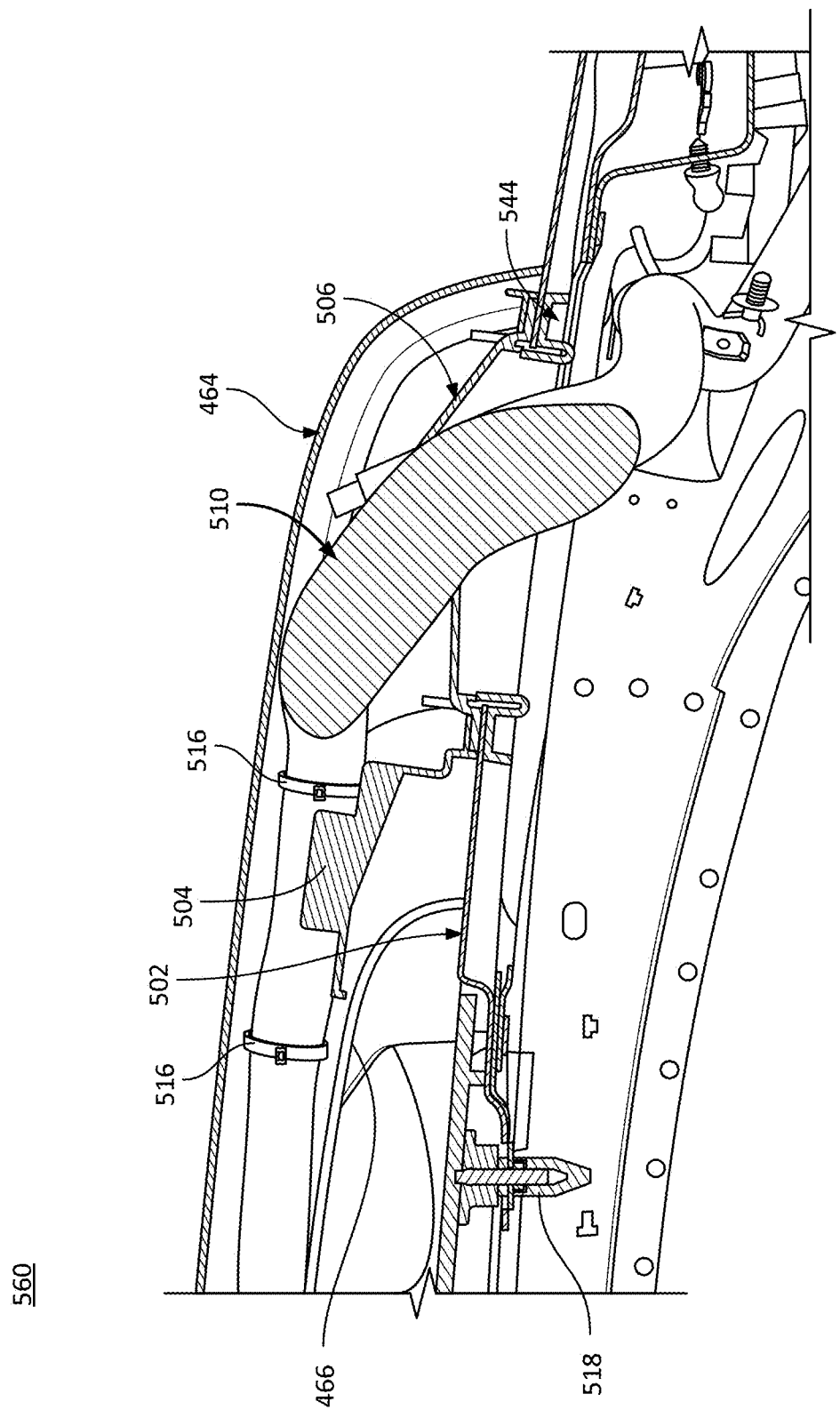

FIGS. 5A-B show perspective and top-down views of the conduit member with the upper housing removed, in order to better illustrate features of the cabling harness assembly. FIG. 5C illustrates a view 540 of the cable harness assembly as seen from the interior of the vehicle. And FIG. 5D is a side cutaway view showing portions of the cable harness assembly and vehicle roof Turning first to view 500 of FIG. 5A and view 520 of FIG. 5B, the base of the assembly mates with the vehicle roof 502 (e.g., of sheet metal) via a carrier and cable guide unit 504 made of, e.g., plastic. As shown, part of the roof 502 may be glass, such as a moon roof or sun roof section 503. A grommet 506 of, e.g., rubber, extends from the carrier and cable guide unit 504. The grommet 506 has a large main conduit 508 adapted to receive a large wire harness bundle 510, enabling it to gauge wires that extend through a sheet metal roof of the vehicle whilst maintaining a watertight seal between the exterior and vehicle interior.

As shown, the large wire harness bundle 510 may split or branch into smaller wire harness bundles 512, 514, etc. Such branches or smaller channels are arranged to carry the links to specific parts of the roof pod assembly. The bundles 512 and/or 514 may be at least partly received by the cable guide portion of unit 504. For instance, one or more "forming troughs" 505 of unit 504 may be used to support different sections of the wire harness along the lower housing 466. These troughs can be integrated into the channel structure of the unit 504. Members 516 may restrain or secure the bundles 514 and/or 516 to the cable guide portion of unit 504, or some other element within the lower housing of the conduit member. Fasteners 518 may be used to secure grommet 506 to the roof.

View 540 of FIG. 5C and view 560 of FIG. 5D illustrate additional components, in addition to the roof 502 and the glass 503 of the moon roof or sun roof. For instance, in this view, in-vehicle sections 542 of the harness extend through the grommet 506. As seen in this view, the grommet 506 is secured to the interior of the roof 502 by a compression ring 544.

As best seen in the top view 520 of FIG. 5B and the cross-sectional view 560 of FIG. 5C, a set of fasteners (e.g., 4 threaded fasteners) engage with the compression ring and the grommet, essentially clamp the layers together to ensure a watertight seal therebetween. Holes in the sheet metal provide a receptacle location for the whole harness assembly, and the sheet metal of the roof provides sufficient support structure for the system.

The various harnesses conduits may be configured to carry power, data, communication lines, liquid (e.g., coolant or cleaning solution) and/or other links to the roof pod assembly. The arrangement as shown is comprised of several components that may be layered as follows: layer 1: plastic carrier and cable guide unit 504; layer 2: grommet 506; layer 3: vehicle sheet metal including roof 502; and layer 4: a compression ring. Here, layer 1 may be the "uppermost" layer while layer 4 may be the "lowermost" layer, from a general alignment perspective.

The grommet's flexible material (e.g., rubber) provides for variation within the harness bundle size. The grommet, plastic carrier and compression ring in combination position the wire harness bundle, ensuring it will be effectively received within the geometrical boundaries of mating components, and keep it away from sharp edges of nearby metal body panels of the roof.

In addition to the main conduit, the grommet may also include one or more secondary conduits 519, as shown in FIG. 5A. These secondary conduits 519 may be used to carry fluid lines and/or service cables from the vehicle to the roof pod. For instance, the fluid line(s) may be used as part of a cooling system for the sensors, a cleaning system for an external wiper system, etc. In one scenario, one or more of the secondary conduits 519 act as a spare "service ports" on the grommet, which is molded as part of the grommet and saved for such a time that a new wire, tube, etc., may need to be installed from the vehicle interior to the roof pod assembly. Initially, such service ports may be molded closed so that there is no physical passthrough between the vehicle interior and the roof pod assembly. Then, at such a time a service port is needed, the closed end can be removed using a cutting operation and then the wire or tube can be passed through it. In an example, each service port may be molded with a stepped diameter, which means that each given service port can each be cut in one of two locations, allowing various wire or tube sizes to fit therealong.

Figure 6A:
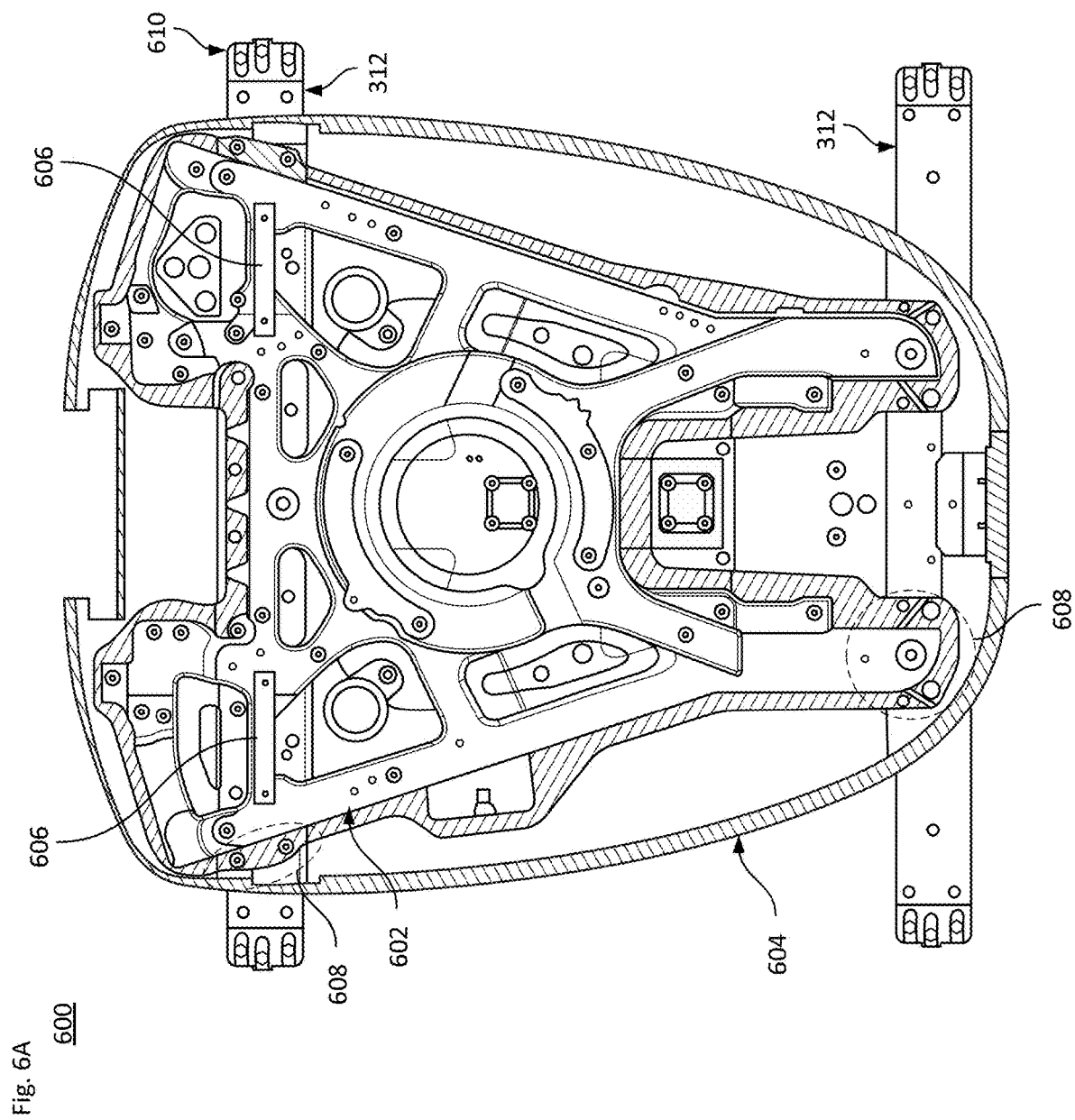

According to one aspect of the technology, the main framework of the base section for the roof pod is a compression molded SMC (sheet molding compound) structure bonded to a lower cover element. SMC provides an appropriate balance of mass and stiffness, while also enabling the integration of mounting points for internal hardware (e.g., sensors) which may be directly mounted to the SMC without needing additional adapter brackets. FIG. 6A illustrates an example 600 showing SMC structure 602 that is bonded to a lower cover 604. The lower cover 604 may be injection molded, which is bonded to the SMC structure 602 along flanges on the SMC structure 602 (not shown). The lower cover 604 serves to close out the open shape of the SMC structure 602, which generates a stiffer structure while simultaneously forming a bottom cosmetic A-Surface for the roof pod assembly.

Considering some of the internal components being affixed to SMC structure 602 are inherently very stiff (e.g., a chassis for a sensor module), these components may be used to reinforce certain areas of the SMC structure 602. The synthesis of these connections further serves to stiffen the entire roof pod assembly. In certain areas where for packaging and integration purposes the SMC structure 602 may be weakened by, for example cutting holes in it or reducing the cross-sectional area, this can be compensated for by adding sheet metal aluminum brackets or other reinforcement components that are bolted to the structure using rivet nuts or are otherwise affixed thereto. For instance, one or more brackets 606 may be used to close the SMC structure 602 where it has been opened up to package an air duct or other passageway.

The lateral support members (e.g., 312 in FIG. 3A) for the roof pod assembly are configured to extend laterally across the roof of the vehicle (as shown in FIGS. 1A-B). The size, shape and material of the support members is based primarily on structural requirements (e.g., system stiffness, durability and meeting FMVSS crash performance), any mass limits of the system, and other operational or functional requirements. For instance, extruded aluminum may be used, as this allows for the creation of a cross section to effectively balance mass and stiffness while also allowing for an aesthetically pleasing shape and surface. The support members may be bolted and riveted to the SMC structure in multiple locations, such as shown by encircled dashed areas 608, in order to create a robust load transfer therebetween. In one example, the support members may each be formed with upper and lower interlocking channels. In this case, the lower channel may be extruded aluminum and the upper channel may be plastic cover which snap fits over the lower channel. Here, the upper channel is, effectively, a cosmetic cover that is not integral to the support function. One example of this is seen in FIG. 6B, where upper channel 312a of, e.g., plastic, snap fits onto lower channel 312b of, e.g., extruded aluminum.

As indicated in FIG. 6A and shown in close-up view 620 of FIG. 6B, a "foot" 610 is disposed on each end of the lateral support members. The feet 610 may be die cast, in which each foot can be bonded and riveted into a respective end of each extruded aluminum support member. Alternatively, the feet may be machined from a solid block of aluminum or other metal. The feet 610 may serve as the adapters in order to mount the roof pod assembly to the vehicle. Structural adhesive may be used for the joint between the support member and the feet, as it allows for a robust load transfer between the die casting and the extrusions. During the assembly process of the feet to the support members, while not required the pitch between the feet can be set using an assembly fixture so that a high degree of accuracy is maintained in order to allow for a repeatable mounting pattern back to the vehicle.

The feet 610 may be inserted into slots, tracks (e.g., cantrails) or another connection system arranged along the roof of the vehicle, such as a roof rack type connection system. As shown in FIG. 6B, foot 610 may be affixed to the vehicle roof, for instance by bolts 622 or other fasteners. In the example of FIG. 6B, foot 610 may comprise an upper foot 624 and a lower foot 626. In this case, the upper foot 624 may be secured to an end of the support member by bonding and one or more rivets 628. The mating plane of each foot to the support member is generally horizontal, which allows for tolerance compensation in the fore/aft and left/right directions of the roof pod assembly relative to the vehicle. A set of bolts 630 can be used to secure the upper foot 624 to the lower foot 626 (e.g., 3×M8 bolts). This allows for optimal load transfer of the Upper Foot to Lower Foot. The lower foot may then be affixed to the roof via the bolts 622

FIG. 7 shows a cross sectional view 700 of a roof pod assembly 702 mounted on a roof 704 of a vehicle. Dashed line 706 indicates a top edge of the assembly, which is tied to the maximum clearance height. And bracket 708 indicates the clearance of the assembly above the roof. Because the roof pod assembly is elevated over the roof, the lateral support members are arranged to provide a minimum clearance above the roof. In one example, this minimum clearance is at least 25 mm. In another example, the minimum clearance may be on the order of 15 mm-40 mm. If the clearance is reduced below a minimum threshold (e.g., below 15-25 mm), wind noise inside the vehicle at speed (e.g., freeway driving) would increase, and cleaning the roof of the vehicle would be extremely difficult. If the clearance were increased beyond a maximum threshold (e.g., beyond 25-40 mm), the roof pod assembly would sit higher above the vehicle and result in an increased maximum clearance height. This would be detrimental for drag coefficient (leading to a reduced operating range of the vehicle), as well as a challenge to park in a garage and an increased likelihood of hitting a low-hanging object over the road (e.g., a tree branch).

As indicated above, a substantial portion of the roof may be glass (see FIG. 4A). Depending on the size and shape of the glass portion of the roof, and the configuration of the roof pod assembly, in one scenario the entire roof pod assembly is raised and appears to float above the vehicle. Raising the base section of the roof pod assembly above the glass allows light to still enter the cabin of the vehicle and maintain the original feel of the glass roof for a passenger. Thus, the minimum clearance over the roof should be large enough (e.g., on the order of 20-30 mm) so that the glass roof can be cleaned while still limiting the negative impact to vehicle aerodynamics and not increasing the risk of branch/tree strikes to the upper section of the roof pod assembly while driving.

Elevating the roof pod assembly above the vehicle's roof allows for certain features to be incorporated into the bottom of the assembly. For instance, one or more water drains can be included along the bottom, e.g., adjacent to the support members. One or more air intake vents can also be provided, for instance to use as part of an active cooling system for the roof pod assembly. For example, as shown in the partial see-through view 800 of FIG. 8A, along the SMC structure and lower cover sub-assembly a set of air inlets 802 and air exhausts 804 may be arranged.

One or more blowers/fans 806 may be arranged to pull air through a ducting system integrated into the lower cover and passes this air through another ducting system inside the roof pod assembly, where it then gets blown at different modules (e.g., sensor units or processing) inside the roof pod assembly. After cooling the modules, the air dissipates inside the roof pod assembly and then exhausts through outlets 804, which may also be integrated into the lower cover. This inlet and outlet ducting system on the lower cover can be created by placing holes along the lower cover just below where each of the fans/blowers are positioned, and then assembling below this a large pan that seals to the lower cover in certain areas and creates air paths or ducts to the perimeter of this pan. For instance, as shown in view 820 of FIG. 8B, pan 822 may overlay the lower cover, whereby one or more air intake vents 824 are provided around the pan 822. Also shown in FIG. 8B is a cover 826 for the front support member. Also shown in FIG. 8B are locations 828 for receptacles where microphones or other transducers may be disposed. In one example, at least 3 or 4 locations, each having a pair of transducers (e.g., for localized noise cancellation), are employed in an acoustical system, are aligned on a plane. The integration of such an acoustical system into the roof pod assembly in this manner allows for triangulation of a sound source in order to determine its location.

Figure 8C:
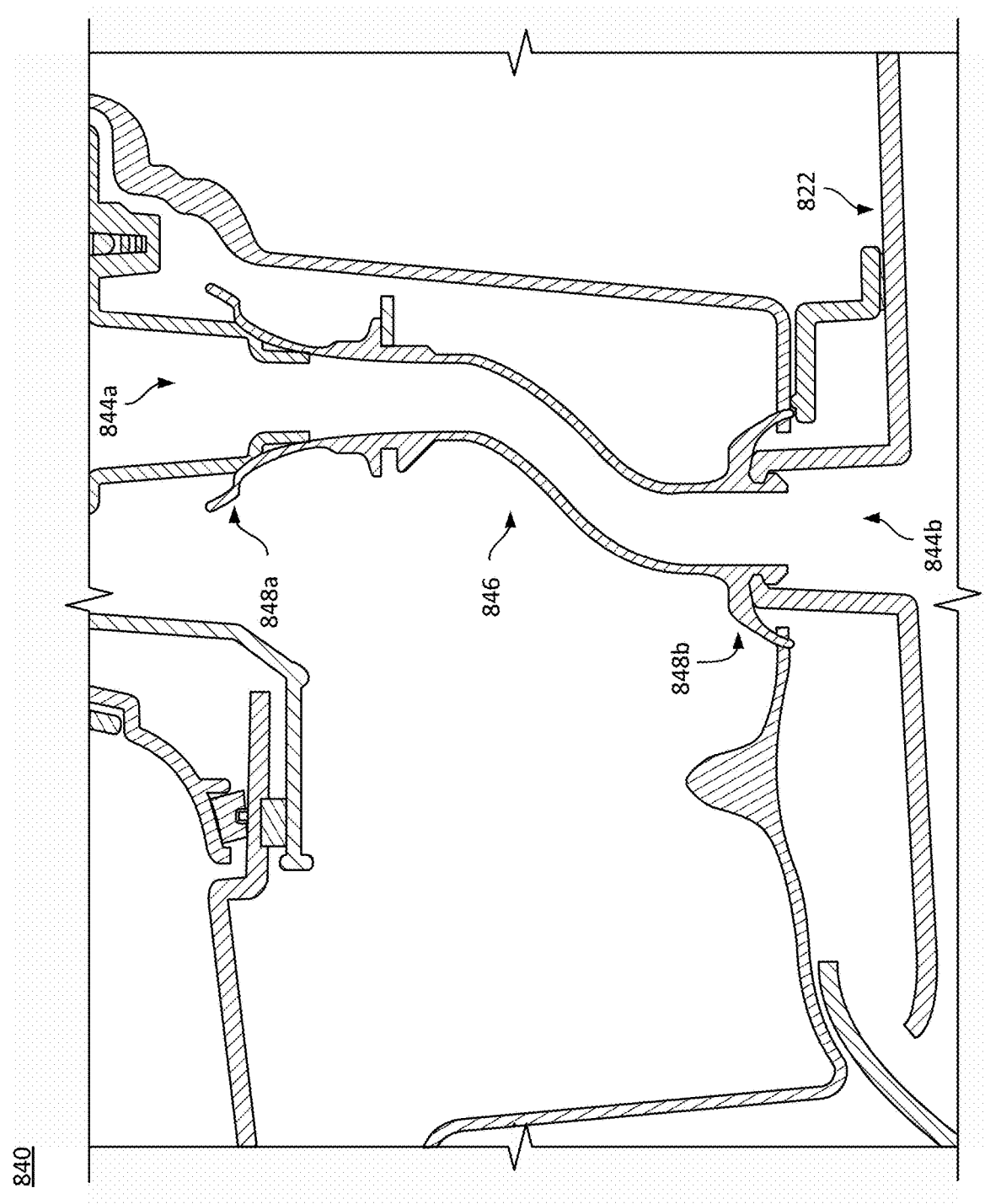

FIG. 8C illustrates a cross-sectional view 840, showing an internal drainage system 842 within the base section of the roof pod assembly. The internal drainage system 842 allow precipitation or cleaning fluid to pass through the base section and drain through the lower cover via openings 844a and 844b. For instance, opening 844a may be a funnel-type water drain from a sensor within the roof pod assembly, while opening 844b may be an inverted funnel-type drain integrated into the pan 822. As shown, the opening 844a couples to the opening 844b via a tube or other conduit 846. Flanges 848a on an upper end of the conduit 846 prevent water leaking from the opening 844a into the interior of the roof pod assembly. Similarly, flanges 848b on a lower end of the conduit 846 also prevent water leaking into the interior of the roof pod assembly. And as indicated in FIG. 4C, the base section may additionally or alternatively include a drainage port 442 arranged below the front end of the roof pod assembly. This drainage port can be positioned below sensors disposed along the front end of the assembly, such as cameras, and allows for precipitation and/or cleaning fluid to drain off the lens(es) of the camera(s) or other sensors through the lower cover and onto the roof of the vehicle.

Figure 8D:
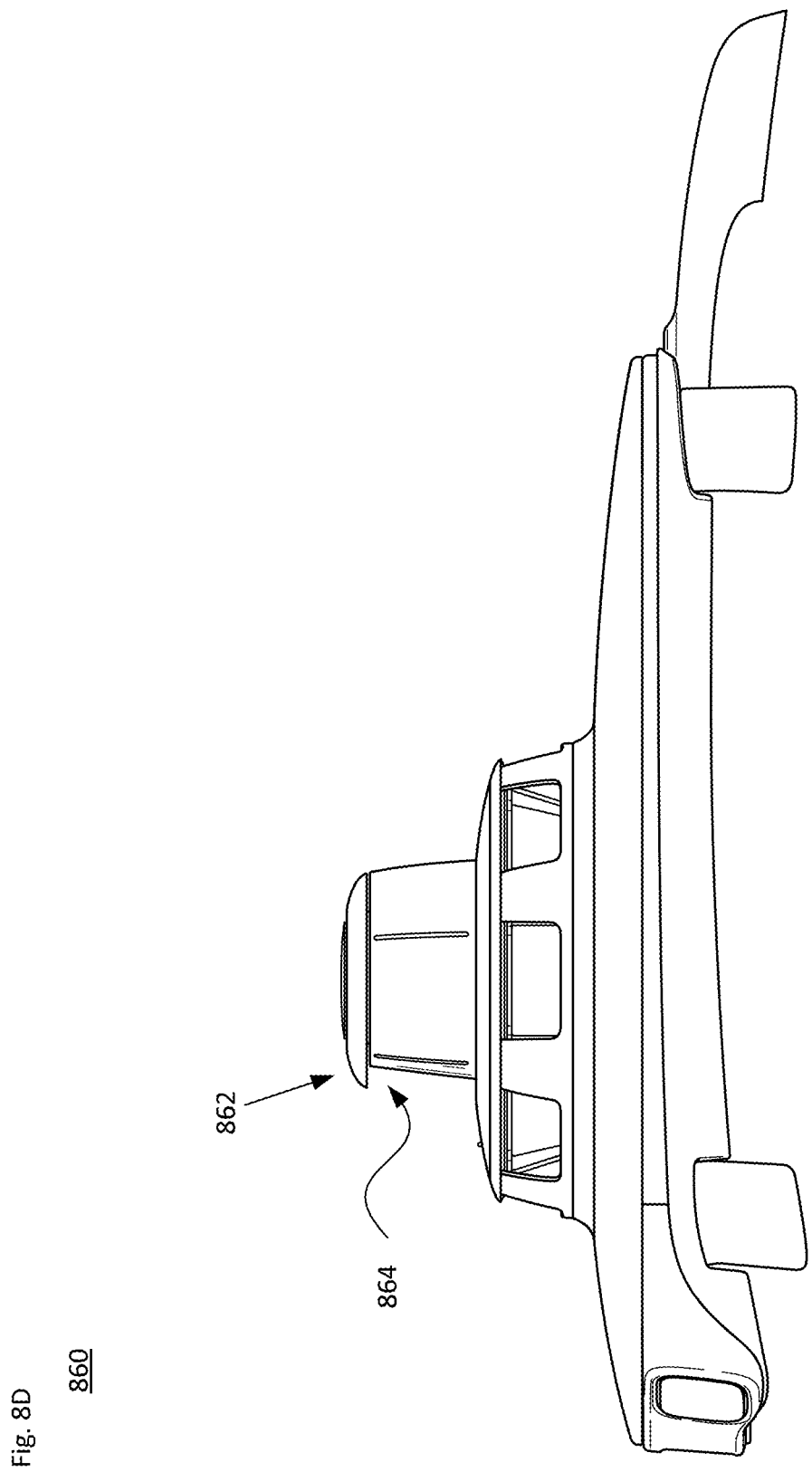

In addition to providing ventilation and drainage along the base section of the assembly, one or more vents may also be located in the upper section of the assembly. As shown in view 860 of FIG. 8D, an overhang 862 at the top of the upper section and a vent configuration 864 beneath the overhang 862 may provide for an inflow or outflow of air to cool off the sensors and other components located in this part of the roof pod assembly.

Figure 9A:
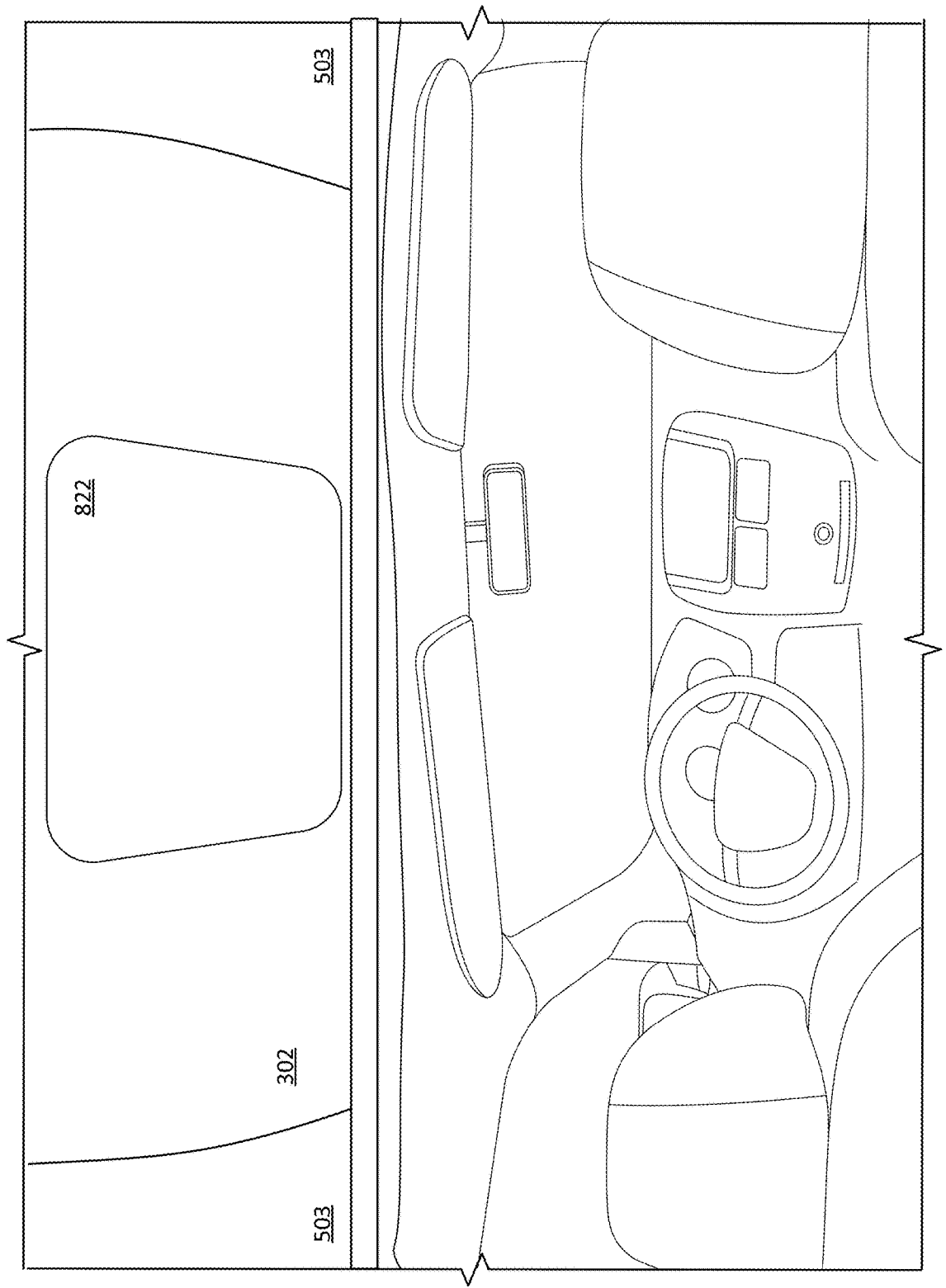
FIGS. 9A-B illustrate an example of roof pod base lighting in accordance with aspects of the technology.
Figure 9B:
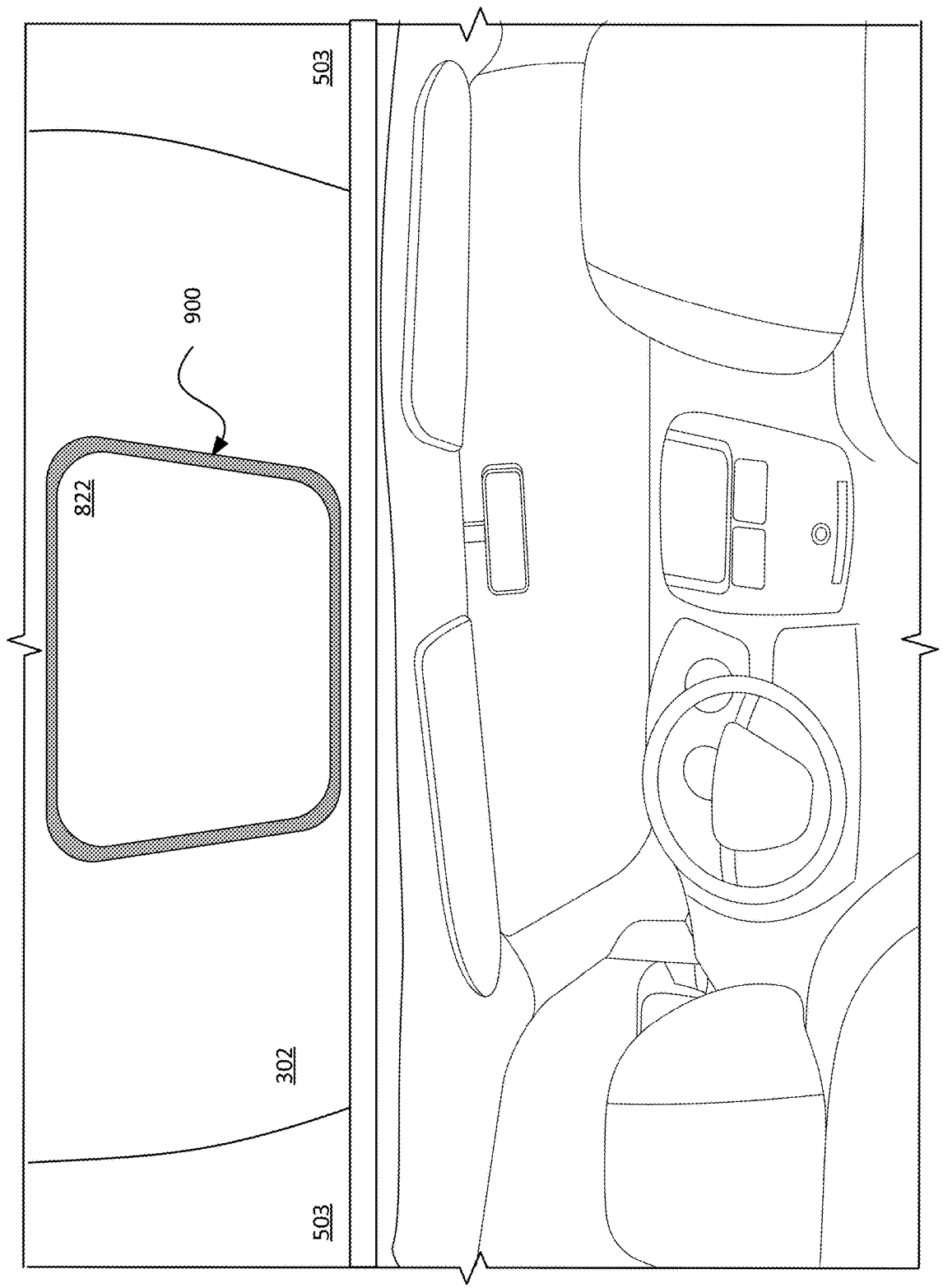

Elevating the roof pod assembly can also provide certain passenger benefits. For instance, as shown in example FIGS. 9A-B, portion 503 of the roof (e.g., a sunroof or moonroof) may be made of glass or another transparent material. Elevating the assembly allows for ambient light to enter the passenger compartment. In addition, as seen in FIG. 9B, one or more portions 900 of the roof pod assembly base may be illuminated, such as along the base section 302 where pan 822 overlays the lower cover. This can be done, for instance to provide certain information to the passengers, including information about ride status (e.g., directions, an upcoming pullover, possible delays, etc.). Different colors or flashing patterns could indicate to a customer hailing a ride that this is their car, or that the ride has ended and that it is time to exit the vehicle.

Figure 10A:
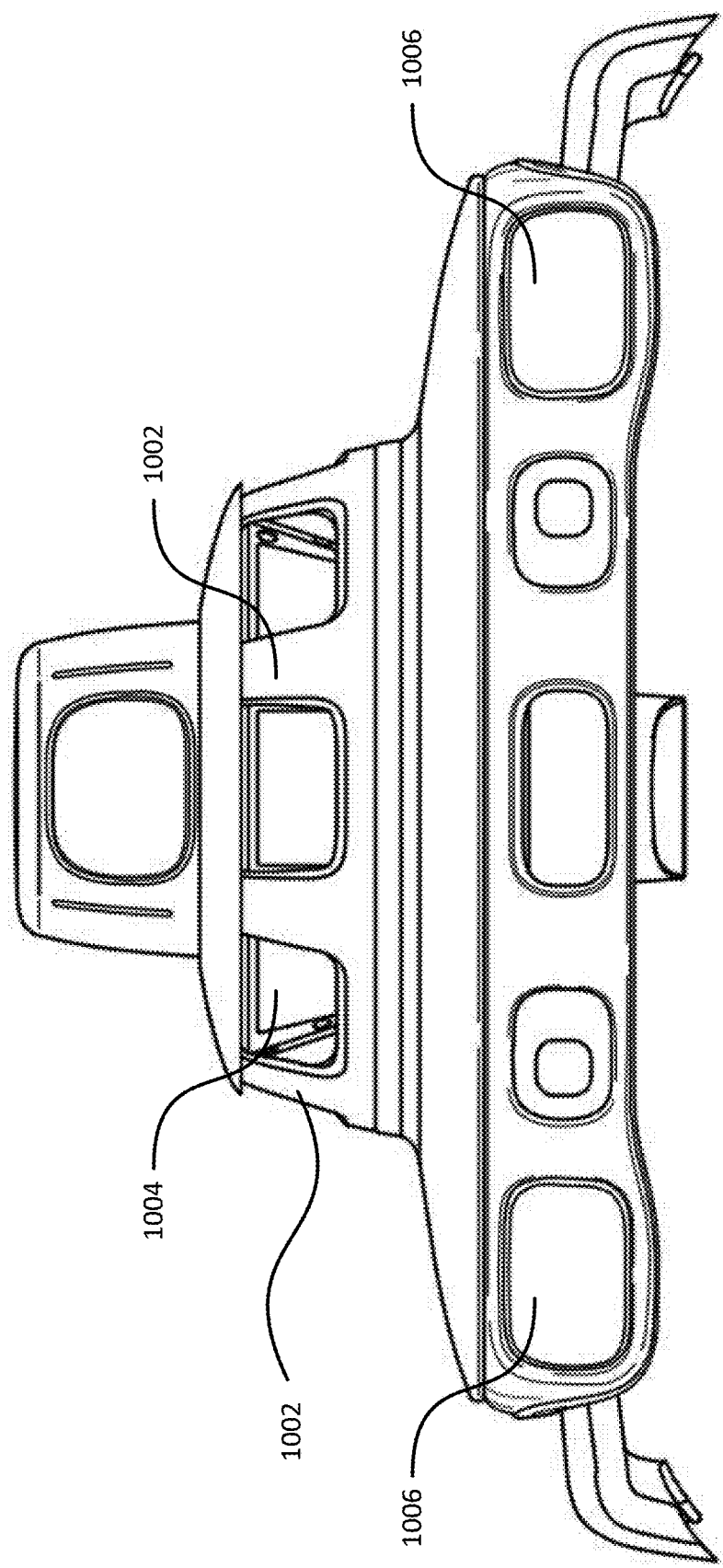
FIGS. 10A-B illustrate example structural configurations in accordance with aspects of the technology.

As noted above, the roof pod assembly includes sensors that may be used to assist in autonomous driving operations. The sensors may include lidar, radar, optical and thermal cameras, acoustical sensors, accelerometers and gyroscopes, etc. A wiper system for cleaning off one or more sensors may be arranged and hidden by the housing, e.g., pillars 1002 as seen in view 1000 of FIG. 10A. This may include one or more individual wiper modules for different sensor assemblies. This can include one or more wipers for the upper dome area, one or more wipers to clear image sensors along the front of the roof pod assembly, etc. The outer lens 1004 of a sensor may be tilted (e.g., downward) to reduce glare into a camera. There may be a matte finish on certain surfaces to reduce reflections. And there may be a distributed arrangement of certain sensors for redundancy, such as to handle an occlusion of one sensor and/or to provide overlapping fields of view.

Figure 10B:
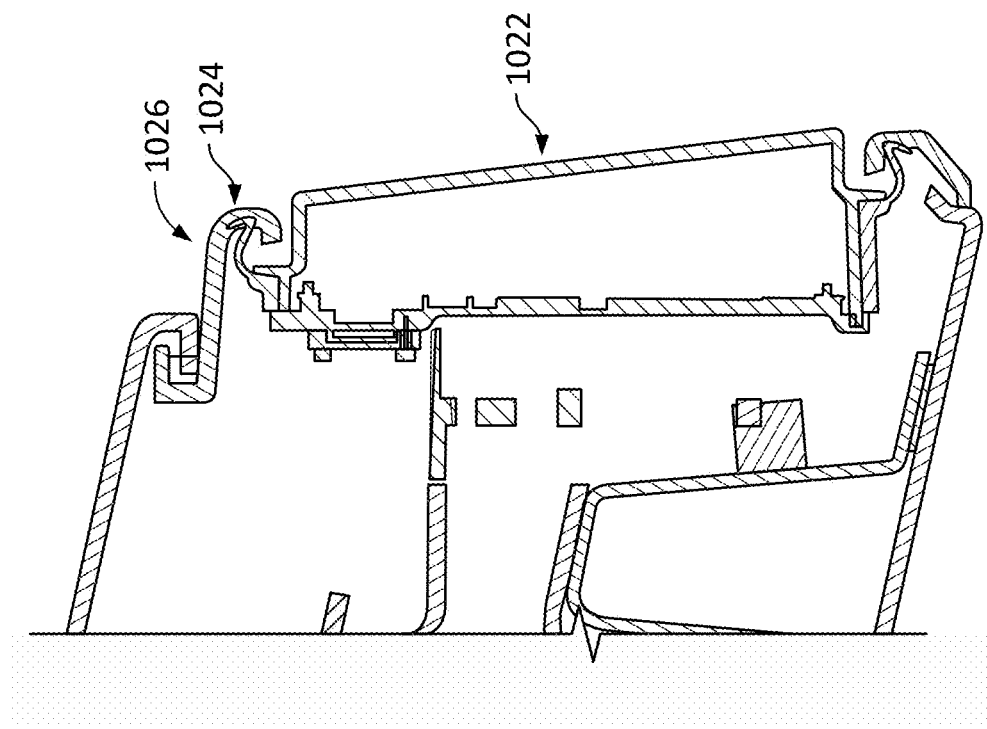

In one configuration, radar sensors may be placed behind cosmetic surfaces in order to hide them. In the case of the example roof pod assembly, 2 radar modules 1006 may protrude through the main A-Surface along the front of the roof pod assembly. As shown in cutaway view 1020 of FIG. 10B, mounted to the primary radome A-surface 1022 on each radar is a seal 1024, which pushes up against the back of the front side of the roof pod assembly, in particular along A-surface 1026 of the front face of the roof pod, in order to ensure that the roof pod assembly remains sealed to the environment. This seal 1024 is compliant enough to cope with component as well as build tolerances between the radars and the front side of the base section of the assembly (306 in FIG. 3A). The radar modules 1006 may also have a pitch adjustment mechanism where the pitch of the radar can be adjusted relative to ground. The seal 1024 is also able to deal with any misalignment between the radar and the front face of the roof pod assembly due to pitch adjustment.

The overall arrangement discussed herein provides a roof pod assembly with various features that enable effective installation on and operation with a vehicle configured to operate in an autonomous driving mode. A cabling harness sub-assembly is arranged in a non-load bearing conduit member separate from lateral support members that elevate the roof pod assembly above the vehicle's roof. The roof pod assembly is designed to have tolerance compensation to account for variations in part size, shape and location. All components of the roof pod assembly, including the cabling harness, can be fully sub-assembled before the entire system is mounted to the vehicle. This allows for the majority of the work to be performed at an ergonomic height with only the last few adjustments being done when the roof pod assembly is positioned on top of the vehicle.

Although the technology herein has been described with reference to particular embodiments, it is to be understood that these embodiments are merely illustrative of the principles and applications of the present technology. It is therefore to be understood that numerous modifications may be made to the illustrative embodiments and that other arrangements may be devised without departing from the spirit and scope of the present technology as defined by the appended claims.

The invention claimed is:

1. A roof pod assembly for use in a vehicle configured to operate in an autonomous driving mode the roof pod assembly comprising:
a housing including a base section and an upper section, the base section having a first side facing towards a roof of the vehicle and a second side opposite the first side, the upper section being disposed along the second side of the base section and extending away from the roof of the vehicle;
a plurality of sensors disposed within or along one or both of the base section and the upper section of the housing, the plurality of sensors being configured to detect objects or environmental conditions external to the vehicle;
a plurality of support members coupled to the first side of the base section, the plurality of support members configured to elevate the housing above the roof of the vehicle so that the housing does not directly contact a surface of the vehicle; and
a conduit member including a harness assembly having a first end affixed to the base section of the housing and a second end configured to affix to a portion of the roof of the vehicle, the harness assembly, including a grommet adapted to receive at least one of electrical wiring, power lines, fluid lines or service cables between the vehicle and the roof pod assembly.

2. The roof pod assembly of claim 1, wherein the conduit member is non-load bearing for the housing of the roof pod assembly.

3. The roof pod assembly of claim 1, wherein the grommet includes a main conduit and one or more secondary conduits extending from the main conduit towards the base section of the housing.

4. The roof pod assembly of claim 3, wherein the one or more secondary conduits branch one or more times to create tertiary conduits that couple to specific sensors or other components within the housing.

5. The roof pod assembly of claim 1, wherein each of the plurality of support members has a lower channel member and an interlocking upper channel member.

6. The roof pod assembly of claim 5, wherein the lower channel member comprises aluminium and the upper channel member comprises a plastic cover that snap fits onto the lower channel member.

7. The roof pod assembly of claim 1, wherein the plurality of support members provides a minimum clearance of at least 10-50 mm above the roof of the vehicle.

8. The roof pod assembly of claim 1, wherein the base section of the roof pod assembly includes one or more air inlets and one or more air exhaust vents.

9. The roof pod assembly of claim 8, further comprising at least one blower unit configured to pull air into an interior of the roof pod assembly via the one or more air inlets and to expel air from the interior of the roof pod assembly via the one or more air exhaust vents.

10. The roof pod assembly of claim 8, further comprising a ducting system integrated into the base section of the housing, the ducting system being configured to pass air different regions within the roof pod assembly.

11. The roof pod assembly of claim 1, wherein the first side of the base section of the roof pod assembly includes a set of transducer receptacles for an acoustical system of the roof pod assembly.

12. The roof pod assembly of claim 11, wherein the transducer receptacles are aligned on a plane to provide for triangulation of a sound source external to the vehicle.

13. The roof pod assembly of claim 1, wherein the upper section of the roof pod assembly includes a dome or layer cake structure with one or more sensors disposed about the structure.

14. The roof pod assembly of claim 1, wherein the upper section of the roof pod assembly includes a ventilation feature.

15. The roof pod assembly of claim 1, wherein the first side of the base section comprises a compression molded structure bonded to a lower cover element.

16. The roof pod assembly of claim 15, wherein the compression molded structure is a sheet molding compound.

17. The roof pod assembly of claim 1, further comprising a compression ring configured to secure the grommet to an interior surface of the roof of the vehicle.

18. The roof pod assembly of claim 1, wherein the grommet includes one or more spare service ports.

19. A vehicle Comprising:
a perception system configured to detect objects and conditions in an environment external to the vehicle;
a control system having one or more processors configured to operate the vehicle in an autonomous driving mode; and
the roof pod assembly of claim 1, wherein the plurality of sensors is part of the perception system.

20. A roof pod assembly for use in a vehicle configured to operate in, an autonomous driving mode, the roof pod assembly comprising:
a housing including a base section and an upper section the base section having a first side facing towards a roof of the vehicle and a second side opposite the first side, the upper section being disposed along the second side of the base section and extending away from the roof of the vehicle;
a plurality of sensors disposed within or along one or both of the base section and the upper section of the housing, the plurality of sensors being configured to detect objects or environmental conditions external to the vehicle;
a plurality of support members coupled to the first side of the base section, the plurality of support members configured to elevate the housing above the roof of the vehicle so that the housing does not directly contact a surface of the vehicle; and
a conduit member including a harness assembly having a first end affixed to the base section of the housing and a second end configured to affix to a portion of the roof of the vehicle, the harness assembly including a grommet adapted to receive at least one of electrical wiring, power lines, fluid lines or service cables between the vehicle and the roof pod assembly;
wherein the base section includes an internal drainage system configured to allow precipitation or cleaning fluid to drain through the first side of the base section via one or more openings.

* * * * *

UNITED STATES PATENT AND TRADEMARK OFFICE
CERTIFICATE OF CORRECTION

| | | |
|---|---|---|
| PATENT NO. | : 11,603,048 B2 | Page 1 of 1 |
| APPLICATION NO. | : 16/935249 | |
| DATED | : March 14, 2023 | |
| INVENTOR(S) | : Albert Shane et al. | |

It is certified that error appears in the above-identified patent and that said Letters Patent is hereby corrected as shown below:

In the Claims

Claim 6, Column 15, Line 45:
Now reads: "aluminium"; should read -- aluminum --

Signed and Sealed this
Ninth Day of May, 2023

Katherine Kelly Vidal
*Director of the United States Patent and Trademark Office*